United States Patent [19]
Aoshima et al.

[11] Patent Number: 5,210,859
[45] Date of Patent: May 11, 1993

[54] PROGRAM DEBUGGING SUPPORT METHOD AND APPARATUS

[75] Inventors: Toshihisa Aoshima, Tokyo; Nobuyuki Takeichi, Kodaira; Masaaki Kurosu, Chofu, all of Japan

[73] Assignee: Hitachi, Ltd., Tokyo, Japan

[21] Appl. No.: 507,391

[22] Filed: Apr. 10, 1990

[30] Foreign Application Priority Data

Apr. 14, 1989 [JP] Japan .................................. 1-092840

[51] Int. Cl.$^5$ ................................................ G06F 11/00
[52] U.S. Cl. ..................................... 395/575; 371/19; 371/29.1
[58] Field of Search ................................ 371/19, 29.1; 364/267.91; 395/575

[56] References Cited

U.S. PATENT DOCUMENTS

| | | | |
|---|---|---|---|
| 4,730,315 | 3/1988 | Saito et al. | 371/19 |
| 4,943,968 | 7/1990 | Hirose et al. | 371/29.1 |
| 4,964,060 | 10/1990 | Hartsog | 364/512 |
| 5,021,948 | 6/1991 | Nakayama et al. | 371/19 |

FOREIGN PATENT DOCUMENTS

| | | | |
|---|---|---|---|
| 0036813 | 2/1984 | Japan | 371/29.1 |
| 0186054 | 10/1984 | Japan | 371/19 |

OTHER PUBLICATIONS

Yourdon, Techniques of Program Structure and Design, ©1975 Prentice-Hall.
Wilensky, Lispcraft, pp. 143-159, ©1984.
PC Tools, Data Recovery, Dos Shell, pp. 43-46, 178-179 ©1990.
Computer Design, Complete Microcomputer Control System Develops and Debugs Programs Online in High Level Language, pp. 146-147, Mar. 1977.
IBM Tech. Disc. Bull. vol. 31, No. 5, pp. 151-154, Oct. 1988.
IBM Tech. Disc. Bull., vol. 27, No. 12, pp. 6909-6910 May 1985.
IBM Tech. Disc. Bull., vol. 25, No. 2, p. 481, Jul. 1982.

*Primary Examiner*—Robert W. Beausoliel
*Assistant Examiner*—Allen M. Lo
*Attorney, Agent, or Firm*—Fay, Sharpe, Beall, Fagan, Minnich & McKee

[57] ABSTRACT

With employment of an information processing apparatus including a display apparatus, and for executing and debugging a program in an interactive mode, the program is debugged in such a manner that when the program is executed, both a calling relationship between each of modules and an execution history therebetween are sequentially stored, and the dependent relationship between the respective modules (module relation diagram) represented by a tree structure, the execution history of the respective modules, and a source program are displayed. Furthermore, a discriminative display is made to the module which is being executed or in which an error occurs on the module relation diagram, and also a statement source program. In addition, both the module relationship diagram and the module execution history as corresponding with each other an be displayed.

29 Claims, 24 Drawing Sheets

FIG.6

```
TEXT (DEFUN QUAD_EQ (A B C)                        ⎫
  "DISPLAY SOLUTION OF QUADRATIC EQUATION"    ⎬ 61
  (LET((D(GET_D  A B C)))                     ⎪
      (PRINT(GET_ANS A B C )))                ⎭

(DEFUN GET_D  (A B C)                         ⎫
  "CALCULATE DISCRIMINANT D OF SOLUTION OF QUADRATIC EQUATION"  ⎬ 62
  (- (* B B)(* 4 A C )))                      ⎭

(DEFUN GET_ANS (A B C)                        ⎫
  "CALCULATE SOLUTION OF QUADRATIC EQUATION"  ⎪
  (IF (= O D)                                 ⎪
      (/ B (* -2 A))                          ⎪
      (LIST (/ (- B (SQRT D))                 ⎬ 63
               (* -2 A))                      ⎪
            (/ (+ B (SQRT D))                 ⎪
               (* -2 A)))                     ⎪
))                                            ⎭
```

FIG.11

| TEXT | REPORT: GET_ANS | LAST | NEXT |
|---|---|---|---|
| (DEFUN QUAD_EQ(A B C) "SOLUTION OF QUADRATIC EQUATION IS DISPLAYED" SETQ D(GET_D ABC)) (PRINT(GET_ANS A B C))) | FUNCTION: | | |
| | ARGUMENT<br>A : 1<br>B : 1<br>C : 1 | | |
| RELATION DIAGRAM | GLOBAL VARIABLE<br>D : -3 [REFERENCE] | | |
| QUAD_EQ —117<br>⎯GET_D<br>⎯GET_ANS | | | |

111 — text region
116 — SETQ D(GET_D ABC))
112 — relation diagram
113 — overall
114 — D
115 — report header

FIG. 12

```
┌─────────────────────────────────┬──────────────────────────────┐
│ TEXT                            │ REPORT:        │ LAST │ NEXT │
│                                 │   QUAD_EQ      │      │      │
│                                 ├──────────────────────────────┤
│ (DEFUN GET_ANS(A B C)           │ FUNCTION:                    │
│ "SOLUTION OF QUADRATIC EQUATION │                              │
│                  IS CALCULATED" │ ARGUMENT                     │
│   (IF (= 0 D)  ~126             │                              │
│       (/ B (*-2 A))             │     A : 1                    │
│       (LIST(/(-B(SQRT D))       │                              │
│             (*-2 A))            │     B : 1                    │
│            (/(+B(SQRT D))       │                              │
│             (*-2 A)))           │     C : 1                    │
│                                 ├──────────────────────────────┤
│ ))                              │ GLOBAL VARIABLE              │
├─────────────────────────────────┤                              │
│ RELATION DIAGRAM                │    D : -3 [UPDATE]           │
│                                 │         ~124                 │
│    QUAD_EQ                      │                              │
│      ├ GET_D                    │                              │
│      └ GET_ANS  ~127            │                              │
└─────────────────────────────────┴──────────────────────────────┘
```

- 121: TEXT panel
- 122: RELATION DIAGRAM panel
- 123: overall frame
- 124: global variable D
- 125: LAST/NEXT buttons
- 126: (= 0 D)
- 127: GET_ANS

FIG. 13

| BRANCH IDENTIFICA-TION NUMBER OF RELATION DIAGRAM | HIERARCHICAL LEVEL | CALLING SEQUENCE LIST OF FUNCTION | DISPLAY POSITION OF FUNCTION TITLES | | EXECUTION CONDITION CODE | ADDRESS OF EXECUTION REPORT |
|---|---|---|---|---|---|---|
| | | | LINE | DIGIT | | |
| 1 | 1 | (QUAD_EQ) | 1 | 1 | -1 | 0 |
| 2 | 2 | (GET_D QUAD-EQ) | 2 | 6 | -1 | 0 |
| 3 | 2 | (GET_ANS QUAD-EQ) | 3 | 6 | -1 | 0 |
| 20a | 20b | 20c | 20d | 20e | 20f | 20g |

FIG.14

| ADDRESSED OF STATEMENTS | TEXT DISPLAY POSITION | | BRANCH NUMBER |
|---|---|---|---|
| | LINE | DIGIT | |
| (GET_D A B C) ADDRESSES | 1 | 14 | 1 |
| (GET_ANS A B C) ADDRESSES | 2 | 18 | 2 |
| (PRINT (GET_ANS---)) ADDRESSES | 2 | 8 | 1 |
| (LET ((--- )) --- ) ADDRESSES | 2 | 3 | 1 |

| BRANCH IDENTIFICATION NUMBER | REFERENCE UPDATING FLAG | VARIABLE VALUE | TEXT POSITION ||
|---|---|---|---|---|
| | | | LINE | DIGIT |
| 1 | 1 | -3 | 1 | 5 |
| 3 | -1 | -3 | 1 | 8 |

```
(defun foo(n) (bar n (fact n)))
(defun bar (x y)(/ y x))
(defun fact (n)(if (= n 0) 1
                    (* n (fact (1-n))))) 
```

FIG.20

```
□ LISP   PROCESS SYSTEM                            201
>(foo 3)
  2        41A
>
```

| □ RELATION DIAGRAM | □ TRACE |
|---|---|
| INPUT-FORM<br>└─ foo<br>   ├─ fact<br>   │   └─(fact)<br>   └─ bar<br>204 | ▼.foo arg : 3<br>▼..fact arg : 3<br>▼...fact arg : 2<br>▼....fact arg : 1<br>.....+fact arg : 0<br>         value : 1<br>▲.... fact value : 1<br>▲... fact value : 2<br>▲.. fact value : 6<br>.. bar arg : 3_6<br>         value : 2<br>▲.foo value : 2 |

```
□ RELATION DIAGRAM              □ TRACE

INPUT-FORM                      ▼ . foo  arg : 3
   └─foo                        ▼ .. fact arg : 3
       └─fact                   ▼ ... fact arg : 2
           └─fact               ▼ .... fact arg : 1
               └─fact                .....+ fact arg : 0
                   └─[fact]
                        └─223
```

221 — (left panel)  222 — (right panel)

FIG.22(B)

```
□ RELATION DIAGRAM              □ TRACE

INPUT-FORM                      ▼ . foo  arg : 3
   └─foo                        ◊ .. fact arg : 3
       ├─ fact ◊  ─ 226, 226a              value : 6
       └─[bar]                     .. bar  arg : 3_6
           └─227
```

224 — (left panel)  225 — (right panel)

FIG. 24

| BRANCH NUMBER OF RELATION DIAGRAM | HIERAR-CHICAL LEVEL | CALLING PATH OF FUNCTION | DISPLAY POSITION OF FUNCTION TITLE | | EXECUTION CONDITION CODE | ADDRESS OF EXECUTION REPORT |
|---|---|---|---|---|---|---|
| | | | LINE | DIGIT | | |
| 1 | 1 | ( foo ) | 1 | 5 | ○ | ○ |
| 2 | 2 | ( fact foo ) | 2 | 10 | ○ | ○ |
| 3 | 3 | ( fact fact foo ) | 3 | 15 | ○ | ○ |
| 4 | 2 | ( bar for ) | 4 | 10 | ○ | ○ |
| | | | | | | |
| | | | | | | |

FIG.25

| EXECUTION SEQUENCE | SERIAL NUMBER OF FUNCTION | CALLING PATH | HIERARCHICAL LEVEL | ARGUMENT OR RETURN VALUE | DISPLAY LINE |
|---|---|---|---|---|---|
| 1 | 1 | (foo) | 1 | 3 | 1 |
| 2 | 2 | (fact foo) | 2 | 3 | 2 |
| 3 | 3 | (fact fact foo) | 3 | 2 | 3 |
| 4 | 4 | (fact fact fact foo) | 4 | 1 | 4 |
| 5 | 5 | (fact fact fact fact foo) | 5 | 0 | 5 |
| 6 | 5 | (fact fact fact fact foo) | 5 | 1 | 6 |
| 7 | 4 | (fact fact fact foo) | 4 | 1 | 7 |
| 8 | 3 | (fact fact foo) | 3 | 2 | 8 |
| 9 | 2 | (fact foo) | 2 | 6 | 9 |
| 10 | 6 | (bar foo) | 2 | 3  6 | 10 |
| 11 | 6 | (bar foo) | 2 | 2 | 11 |
| 12 | 1 | (foo) | 1 | 2 | 12 |

24a  24b  24c  24d  24e  24f

PROGRAM DEBUGGING SUPPORT METHOD AND APPARATUS

BACKGROUND OF THE INVENTION

The present invention relates generally to a program testing and debugging support system. More specifically, the present invention is directed to a method and an apparatus for monitoring, investigating an execution path and an execution condition of the program, and for retrieving an execution history after the program is executed.

In a conventional method as described in, for instance, Japanese Patent Application Laid-open No. JP-A-63-100543, when an error occurs during an execution of a program, a source program portion of a module where the error occurred (either a user function or a subroutine) is displayed an a statement causing the error can be discriminated thereby.

Also, as described in "LISP/VM Programming Environment" of Report on SIGSYM 31 (March, 1985), Information processing Society of Japan, another method is described wherein the execution position of the source program is displayed on the screen so as to be discriminated in statement units. An execution sequence of a program is thus monitored statement-by-statement. On operator can monitor the sequence of execution of the program in such a manner that an executed position in the source program displayed on the display screen is shown distinctively from the other positions.

Lastly, "Programming Environment Based on Program Constitution Diagram" by Ueda, et al., Information Processing Society of Japan, 37th (September 1988) describes a program debugging support system.

SUMMARY OF THE INVENTION

An object of the present invention is to provide a method and apparatus capable of specifying either an execution position of a program, or an error occurring place in an overall structure of the program. The method and apparatus is capable of easily grasping both an error occurrence place in an overall structure of the program and also conditions of each module comprising the program. A user is able to see an execution path from the start of the program and occurrence of an error and to know as to how the error occurred in execution of the program.

Another object of the present invention is to provide a method and an apparatus capable of readily retrieving and/or referencing a report on an execution history of a program in connection with a module relation diagram.

The above-described objects are achieved based upon the following recognition of various problems associated with prior debugging systems. That is, a cause for an occurrence of an error during an execution program is not limited only to a place (single line of source text, etc.) where the error occurs. Accordingly, it is very difficult to find out the cause of the error without investigating a path to reach the error occurring place (the single source code line) and a content of a relevant variable. Then, in the conventional method, to extract this relevant information a PRINT statement to print out the content of the execution must be inserted into the program beforehand, a break point for designating an interruption of the execution of the program must be set, or re-execution of the program must be made to trade values of arguments and a return value of each module.

In the above-described conventional method for displaying a report on a place where an error of the program occurs and also the execution position of the program, there is a limitation of identifying a position within a range of one executed module. Furthermore, no supporting means has been prepared by which the execution position within the entire program, and the execution history of the respective modules and also the module calling relationship up to the preset stop position are macroscopically understood. As a result, it is difficult to investigate the execution path of the program and also to grasp the error occurring position within the entire program as a whole.

Furthermore, there is another problem that when the execution content of the program is traced, a large quantity of trace information is retrieved and thus a long time is necessarily required for digesting the information in order to specify the error occurring place and to investigate the error occurring causes.

To achieve the above-described objects of the present invention, a module relation diagram is formed which indicates a structure of an overall program and a hierarchical tree structure of a calling relationship of each module. This module relation diagram is displayed together with a source program. In addition, an execution position of the program on a position where an error occurs is displayed on a corresponding position of the source program displayed and the module relation diagram.

To display the execution position on the module relation diagram, information indicative of the module calling relationship is stored beforehand in a tree table, according to which the module relation diagram is displayed. With respect to each branch of the tree structure indicative of the calling relationship between modules, the tree table has an identification number for each branch of tree structure which shows the module calling relationship, a hierarchical level which shows a depth of calling, a calling sequence list of a current module and a display position of the module name of each branch with respect to each branch of the tree structure indicative of the module calling relationship.

To represent a position on a source program in accordance with a step-by-step execution of the program, the source program (function definition) of a newly called module (function) is extracted at a time instant when this module is newly called, and a corresponding relationship between an address storing each statement within the module (referred to as an "address of a statement"), and a display position of each statement for the corresponding source text is stored into a test table.

Then, while executing the program, both the calling sequence list of the module name up to the above-described module and the address of the statement to be executed are continuously fetched and the fetched value is stored into a memory apparatus.

Subsequently, based upon both the calling sequence list of the module name which has been stored into the tree table and the address of the execution statement which has been stored into a text table, the execution positions on the module relation diagram and the source text are extracted, and then both the execution positions are displayed.

It should be noted that if the execution position of the source text is not required to be displayed during the execution of the program, the above-described text table may be formed with respect only to such a module that an error occurs at a time instant when the error happens to occur.

As a consequence, when the error occurs, the text display position of the executed statement is extracted with reference to the text table which has stored therein the relationship between the address of the statement and the display portion thereof based upon the address of the present statement previously fetched. Also, the display position on the relation diagram is extracted from the corresponding list of the tree table based upon the above-described calling sequence list of the module name up to a presently executed module. Thus, the position for the occurrence of the error may be displayed on both the source text and the module relation diagram. Similarly, the execution position may be displayed during the step-by-step program execution.

Furthermore, to retrieve the execution history of the program after the program has been executed, values of arguments and a return value to the respective modules, and also results for referencing and updating the variables within the module are stored as report data when each of these modules is executed.

A same dependent relationship with the module relation diagram is constructed by a pointer of the report data. Each report on the execution history is linked by a forward pointer in a module calling sequence, and furthermore linked by a backward pointer in a module ending sequence.

Both an updating (writing) progress and a referencing (reading) progress on a global variable which is commonly used among a plurality of modules are held as a report, whereby the updating and referencing progresses may be traced via the report on the execution content on the scale of a unit of the above-described module after the program has been executed. As a result, both a referencing sequence and an updating sequence of the global variable may be grasped in connection with the module position on the module relation diagram.

Since the report on the execution contents for the respective modules is held in accordance with the identification number attached to the corresponding branch in the module relation diagram, the execution history with respect to the designated branch in the module relation diagram can be easily displayed.

Furthermore, since each of the execution history report is linked by the bidirectional pointers constituted by the module calling sequence and module ending sequence, an easy reference may be made to both of the forward and backward reports with respect to the history report.

BRIEF DESCRIPTION OF THE DRAWINGS

FIG. 6 represents an example of a module, in the form of a user defined function (a program for calculating a solution of a quadratic equation and for representing the resultant solution) employed in the preferred embodiments of the present invention;

FIG. 11 represents a screen example in which a final updating position of a global variable designated on the displayed execution history is retrieved to be displayed;

FIG. 12 represents a screen example in which a position where a global variable designated on the report data is subsequently referred and updated, is retrieved to be displayed;

FIG. 13 illustrates a tree table for holding information on a module relation diagram;

FIG. 14 is a text table for holding the relation between an existence position of each statement within a module and a position corresponding to a display text;

FIG. 18 is a table for holding a reference/update history of a global variable;

FIG. 19 represents an example of a user defined function employed in the fifth preferred embodiment (a program for calculating both a factorial of n: and a factorial of n/n);

FIG. 20 represents a display example of a screen according to the fifth preferred embodiment, in which trace data consisting of an argument and a return value is represented;

FIG. 22A represents another screen on which both a module relation diagram during a recursive call of a function and a trace data are displayed, and all calling relation of the called functions are expanded;

FIG. 22B represents an example for representing both a module relation diagram after the recursive call has been completed and reduction of the trace data;

FIGS. 23A to 23C represent screen display examples when a hierarchical retrieval for trace data of an executed program is performed; in which FIG. 23A is an example for displaying trace data of a function designated on the module relation diagram, FIG. 23B is an example for representing a first-stage expansion of lower-graded trace data shown in FIG. 23A, and FIG. 23C is an example for representing a first-stage expansion of the lower-graded trace data shown in FIG. 23B;

FIG. 24 represents a tree table for holding information corresponding to the module relation diagram according to the fifth preferred embodiment; and, FIG. 25 indicates a table for holding the trace table according to the fifth preferred embodiment.

DESCRIPTION OF THE PREFERRED EMBODIMENTS

Figure 1:
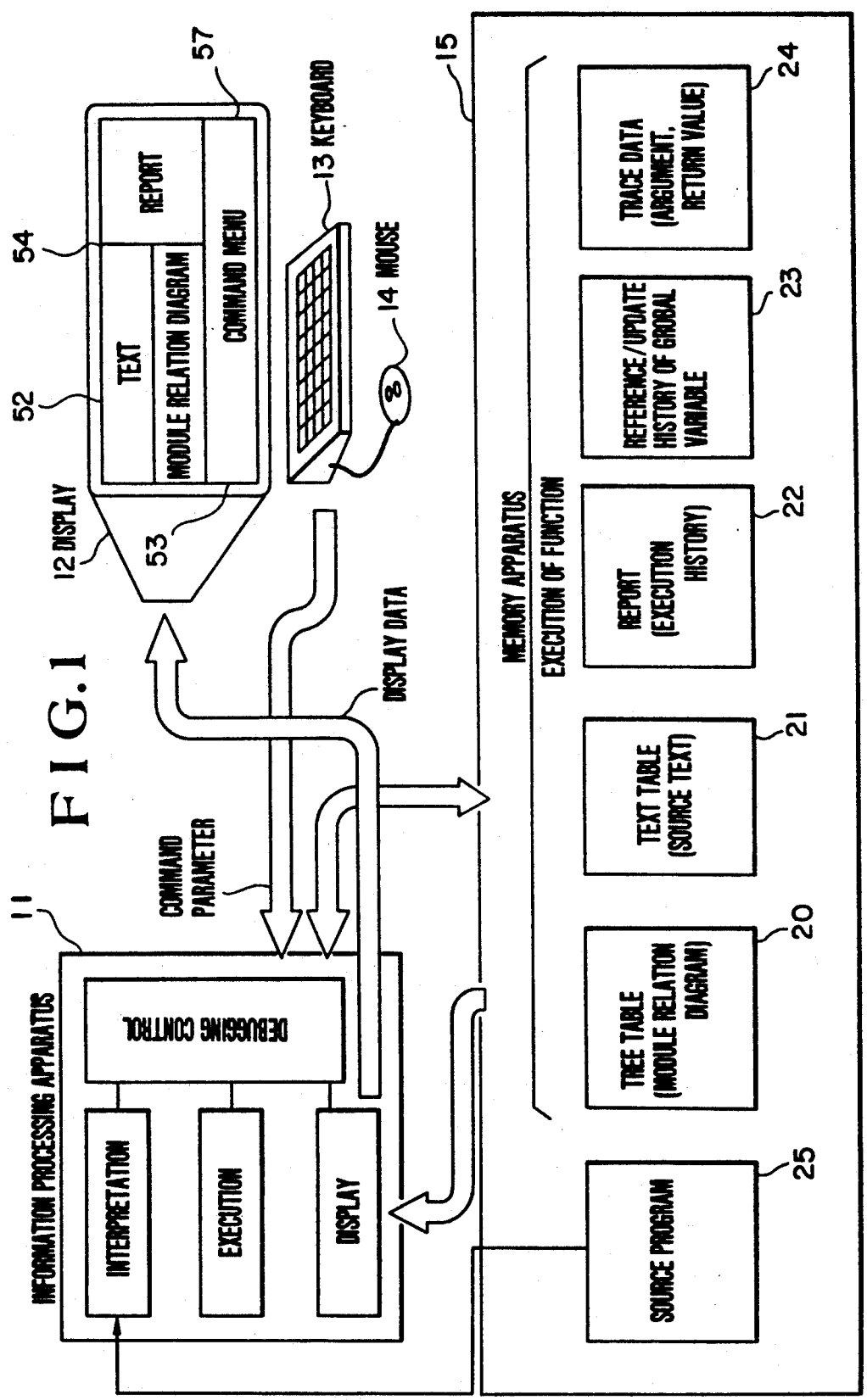
FIG. 1 is a schematic block diagram of an arrangement of an overall system according to a preferred embodiment of the present invention.

FIG. 1 schematically represents an arrangement of an overall system for performing a debugging support method according to a preferred embodiment of the present invention. The system is capable of realizing such a debugging support method by way of a usual workstation and a normal personal computer.

Reference numeral 11 indicates an information processing apparatus. In this information processing apparatus 11, a program for executing the debugging support method according to the present invention, and a table and data (will be described later) which are formed during the program execution, are stored into a main memory apparatus (not shown in detail in the Figure) employed therein. Reference numeral 12 denotes a display for displaying thereon a source text 52 including an error occurrence place or position to support the debugging, a function calling diagram of an executed program, a report 54 of an execution history, and a command menu 57 for initializing a support function. Furthermore, reference numeral 13 represents a keyboard for inputting commands and parameters thereof to utilize the debugging support function by a user and for inputting/editing a source program, Reference numeral 14 is a mouse employed so as to select and designate a command menu and a text for display on the screen. Reference numeral 15 indicates a memory apparatus for externally storing a program 25 functioning as an object (target) of debugging, and tables and data 20, 21, 22, 23, 24.

The debugging support method during an error detection will now be described as one preferred embodiment of the present invention using an example of a simple program which obtains a solution of a quadratic equation.

FIG. 6 is an example for displaying a source program described by using LISP (list processor) language on a screen of the display 12. This sample LISP program comprises three user defined functions (in case of LISP, each of the functions corresponds to a program module) including QUAD_EQ for displaying a solution of a quadratic equation, GET_D for calculating a discriminant "D" of the solution, and GET_ANS for calculating the solution. Assuming now that a, b and c of a generic form of a quadratic equation: $ax^2+bx^2+c=0$ are recognized as arguments (parameters), and the function QUAD_EQ (function definition 61) is recognized as call: first, a function GET_D (62) is called and the discriminant D is calculated, thereafter GET_ANS (63) is called, the solution containing the discriminant D is calculated and the solution is displayed as to the function QUAD_ED.

When a proper numeral is supplied to arguments A, B and C, and then the function QUAD_EQ is executed, the process system of LISP (LISP interpreter) reports an error in that the value of a variable "D" is undefined. The user typically is unable to understand the actual cause of the error through only the previous error message. In accordance with the above-mentioned application, JP-A-63-100543, it is possible to distriminitable-display an error occurrence position on a source text of the user defined function GET_ANS where the error occurs.

Figure 7:
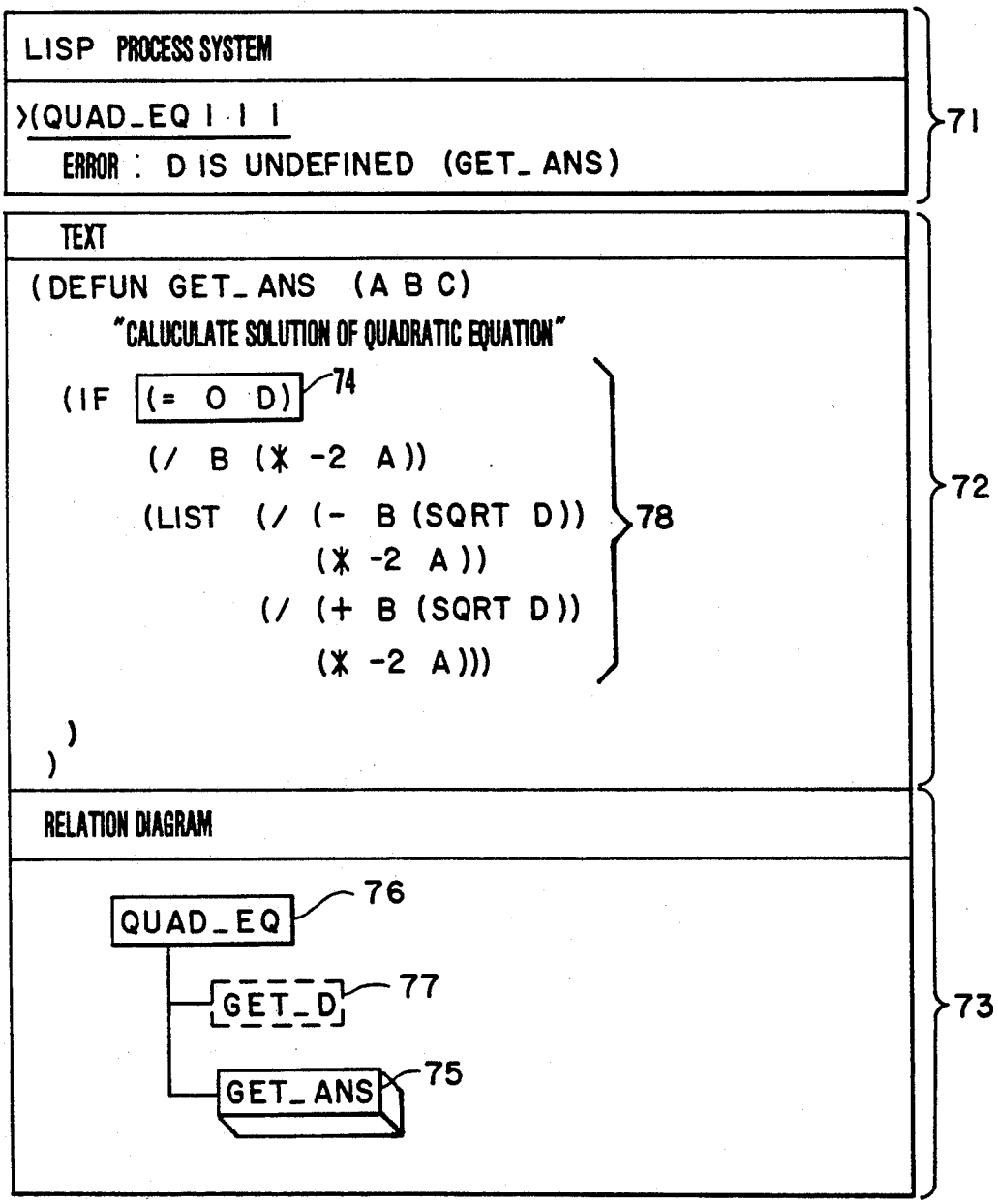
FIG. 7 represents an example of a display screen for showing the error occurring position according to the first preferred embodiment of the present invention.

FIG. 7 represents a display screen of an error occurrence condition according to the first preferred embodiment of the present invention. In FIG. 7, region 71 is a display of an interactive process with respect to the LISP process system and region 72 is a display of a source text of an error occurrence module in which a place 74 is discriminatively displayed as an error occurrence place.

In addition to the displays of the regions 71 and 72, a function calling diagram (referred to as a module relation diagram) 73 of an executed program is displayed on the display screen at the same time as the underlying execution. In the region 73, a function 75 in which an error occurs, a function 76 under execution, and an executed function 77 are discriminatively displayed on this module relation diagram with different display attributes. As a result of this displaying operation, the position of the source text in which the error occurs, a calling relationship of the executed function, and an execution condition of the respective functions can be simultaneously grasped by the system user by viewing a single screen. Since the typical module relation diagrams are more complex in the actual application programs and also the same function names may be referenced at the different hierarchical levels on the module relation diagram therein, the execution condition displays on the module relation diagram in accordance with the preferred embodiment are useful to correctly grasp an error state, an execution condition, and an execution path. It should be noted that the functions on the module relation diagram are only the user defined function except for the functions assembled in the system. It should also be noted that data on a module relation diagram which is newly produced and displayed is held in a tree table 20 as represented in FIG. 13.

The tree table 20 contains an identification number 20a for each of the branches constituting the module relation diagram; a hierarchical level 20b representative of a depth of a function call; a calling sequence list of functions 20c; display positions for each of function names 20d, 20e (relative positions with respect to the function name at the head position); and, an execution condition code 20f for indicating whether or not the program is presently under execution, or has been executed. It should be understood that the function name positioned at the head position in the function calling sequence list corresponds to the function name of the branch in the module relation diagram, and furthermore, the display position of the respective function names is equal to one function per single line and also set in such a manner that its position is shifted to a right side on the screen by a predetermined distance encoded as a single digit number in conformance to the respective hierarchical level. The last column of this table 20 is a position to store an existence address 20g of an execution report of the corresponding module, which is not employed in the first preferred embodiment. From the content of this table 20, the region 73 shown in FIG. 7 can be represented.

FIG. 14 shows a detail of the text table 21. Text table 21 has a corresponding list among addresses in region 21a, display positions in region 21b of the source statements and branch numbers in region 21c on the module for the statement by which the user defined function is referred. The statements of the source program are stored at addresses in region 21a.

Based upon the contents of this text table, the source program of the function under the execution is expanded and displayed on the region 72 shown in FIG. 7. In FIG. 14, there is shown an example of a text table with regard to a function QUAD_ED. Here, the source text position (corresponding to an error occurrence position during an occurrence of an error) under the execution is obtained by comparing an address of an equation in question under the execution held by an internal variable with a value of 21a as shown in FIG. 14.

Figure 8:
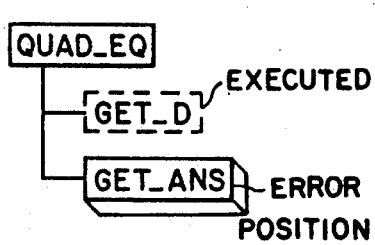
FIG. 8 represents another example of a display screen for showing the error occurring position, corresponding to the display screen example of FIG. 7, to which a report on execution content of an error occurrence function has been added, similar to a screen display according to the second preferred embodiment of the present invention.

FIG. 8 represents an example of a display screen (note: region 87 is not contained), which is extended from the above-described first preferred embodiment. Contents of the regions 81 to 83 are identical to those of the regions 71 to 73 shown in FIG. 7. The region 84 corresponds to an added display portion in which both an actual statement of a function where an error occurs, and a value of a variable which has been updated until the error is produced within the function are simultaneously displayed with the representations (regions 82 and 83) of the above-described error occurrence position as a single report.

Figure 15:
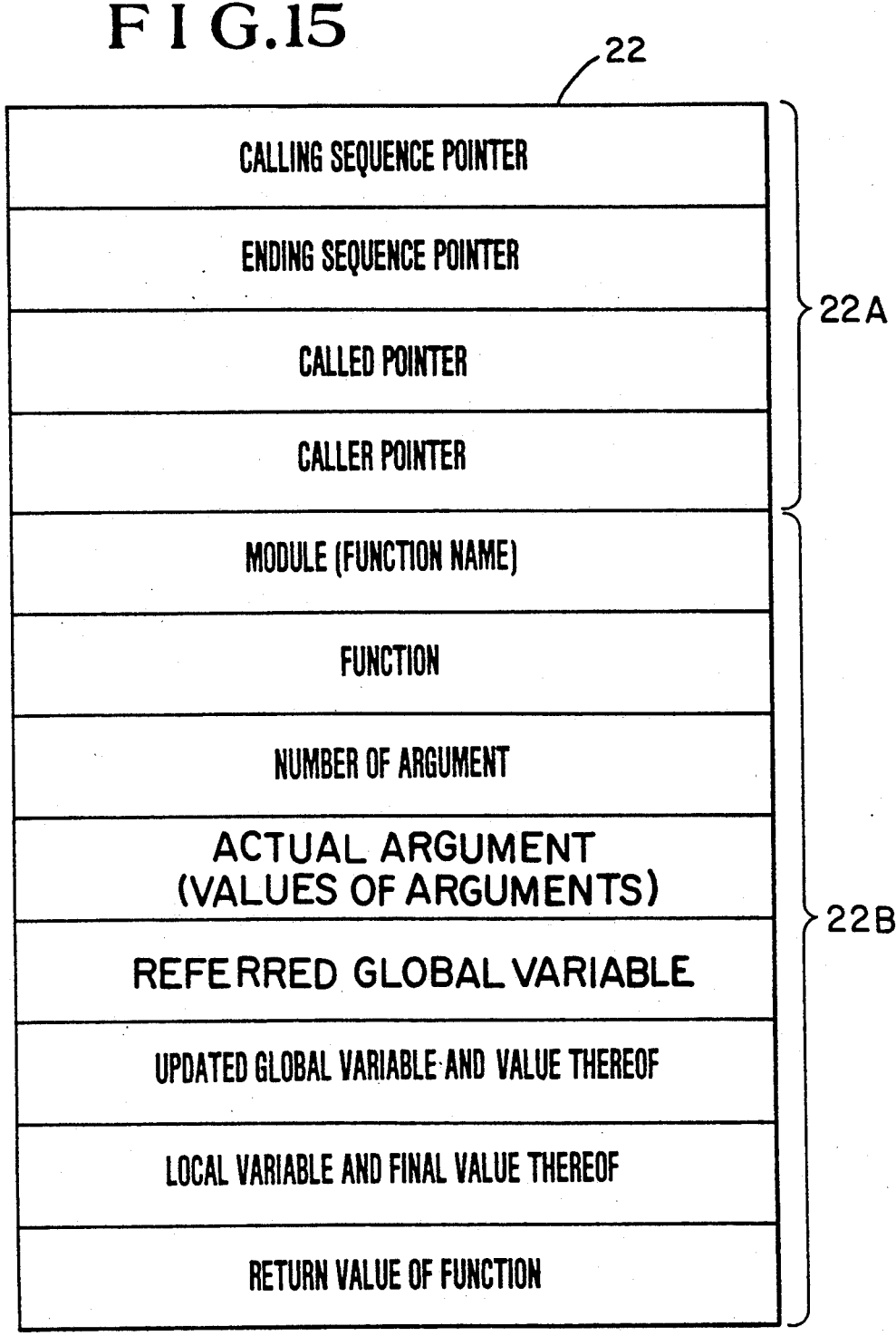
FIG. 15 illustrates a content of the execution history report data.

FIG. 15 represents a format and content of execution report data 22 for each function unit. This report data 22 is constructed of a pointer section 22A for representing a link between the execution report data, and a second 22B of an execution history content. The execution history content section 22B is arranged by a function name, an explanation of a function (comment statement written at a predetermined position of a source text), a number of arguments, values of arguments, a name of referred global variable, a name of an updated global variable and a value thereof, a local variable and a final value thereof, and a return value. It should be noted that there is no return value under the execution of the function.

The data in the region 22B shown in FIG. 15 is expanded into character series and then transferred to the region 84 shown in FIG. 8, whereby it is displayed.

Figure 2:
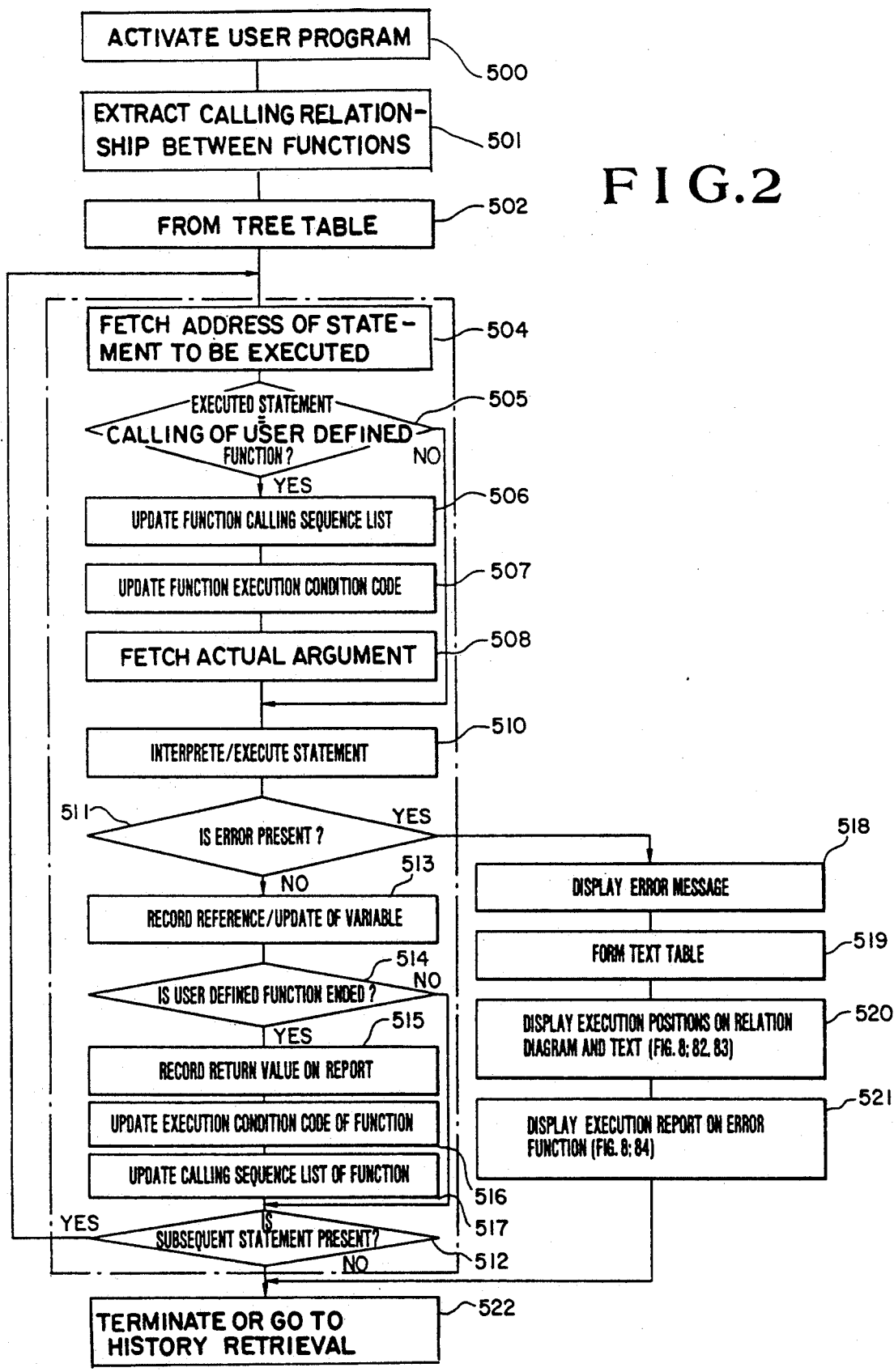
FIG. 2 is an overall process flowchart for realizing a display of an error occurrence condition according to a first preferred embodiment of the present invention.

FIG. 2 is a flowchart for representing an internal process used to realize the above-described first preferred embodiment.

In process 500, a user program (function) to be debugged is activated. In process 501, a calling relationship of a function corresponding to the relation diagram 73 shown in FIG. 7 is extracted. A LISP program is represented as shown in 72 of FIG. 7 in a list form with parenthesis. A first element of this list is interpreted as a function in such a way that each of the lists is the function, argument$_1$, ---, argument$_n$. It should be noted that the function is an assembled function previously prepared for the LISP processor system or a user defined function. In the process 501, calls of the user defined function are picked up. Each statement of user defined function picked up is furthermore sequentially retrieved. The extracting process of the calling relationship is then repeated until there are no remaining calls of the user defined function. The thus obtained function calling relationship may be described as a list expression of a tree structure. For instance, the function calling relationship shown in the first preferred embodiment is described as (QUAD_EQ (GET_D) (GET_ANS)).

In a process 502, a tree table in a form shown in FIG. 13 is formed from the list of the tree structure obtained in the previous process 501.

In the process 502, a series of identification numbers are added in accordance with branches (elements) for constituting a relation diagram, and a position (display position) of function names of the respective branches is determined. Furthermore, although this tree table owns both the execution conditions of the respective functions and the addresses of the execution reports for each function, all of these items are initialized to 0 at the beginning. The values of arguments of the called function is fetched and recorded in the execution report. The tree table has the condition codes of execution for the respective functions and the addresses storing the execution reports for every called function.

It should be noted that tree table forming methods include a method for retrieving the source text of the user program just after the calling of the user program so as to firstly extract the statically determine calling relationship, as previously described, and a method for acquiring a dynamic calling relationship at the time instant where a reference of a function occurs during the execution of the user program so as to dynamically form the tree structure. In this preferred embodiment, the first-mentioned method has been employed. As in the second preferred embodiment, the static relation diagram is first required in order to designate an interrupt point and a range of a sequential execution on the module relation diagram at the beginning of the execution of the user program.

Processes defined by 504 to 512 are repeated every time the respective functions contained in the user program to be debugged are called so as to be executed. In the process 504, an address of a statement to be executed is fetched.

The processes 506 to 508 are executed only just after the user defined function is called by the judgement of the process 505.

The process 506 corresponds to such a process for updating a list of a function calling sequence by adding a function name presently called.

In the process 507, a condition code (e.g., "1" represents "executing" or "under execution") of the presently called function is recorded on the execution condition code column 20f in the above-described tree table 20. For instance, a condition code "1" represents "under execution" and a condition code "−1" indicates "executed". The term "under execution" represents that a lower level function called by the function is being executed.

In the process 508, the actual arguments of the called function are fetched and recorded in the execution report 22.

Subsequently, in the process 510, a statement to be presently processed is interpreted and executed (referred to as "evaluation" in LISP). In the process 511, a check is made whether or not there is an error. If an error occurs, then the process defined from 518 to 521 are performed. As a result of the execution of the statement in the process 510, when the reference and update of the variable occurs, the results of the reference/update process for the variable are recorded on the report 22 at the process 513.

It should be noted that the processes defined from the process 510 to process 511 are executed by the LISP interpreter.

When a judgement is made at the process 514 such that the user defined function is ended, the return value of the user defined function is recorded on the report 22 in process 515. In the process 516, the execution condition code of the tree table is updated to −1 (i.e., executed). In the process 517, a deletion is made to the function name position at the head of the list of the function calling sequence which has been recorded in the internal variable.

Furthermore, in the process 512, the pointer indicating the statement to be executed is advanced. Thereafter, a check is made whether or not there is a statement to be executed. If yes, then the processing jumps to the process 504 again and the processes defined after the process 504 are repeated.

The processes surrounded by the dash and dot line of FIG. 2 are recursively repeated in response to a hierarchical call of a function. That is to say, if the argument of the statement to be executed is further equal to the execution statement, the process defined by the dash and dot line shown in FIG. 2 are repeated. When all of the multiple-called function executions are accomplished, the process drops through the recursive loop.

After the functions have been executed, if the result (return value) of the user defined function corresponds to an expected value, then the debugging operation is complete. However, to the contrary, if the return value does not correspond to the expected content, the process is advanced to an execution history retrieval (FIG. 4) according to a further embodiment (will be discussed later). On the other hand, when an error is detected by the process 511, an error message is displayed in process 518.

In process 519, as to such a function that the error occurs, the text table having the form indicated in FIG. 14 is produced. In a process 519, each of the statements for constituting the function is extracted and head addresses of the respective statements are stored into the region 21a of FIG. 14.

Subsequently, in accordance with the hierarchical calling level of each statement, the statements are arranged on the screen for the sake of easy observation, as shown in the region 72 of FIG. 7 or region 82 of FIG. 8. Then, display positions of the statements are recorded on the region 21b of the text table. Furthermore, in case that the statement refers to the user function, the branch number on the relation diagram is added to the region 21C.

In process 520, the error occurrence positions are displayed on both the module relation diagram and in the source text. Here, a reference is made to the previously set tree table and the contents of the text table. The presently executed position corresponding to the error occurrence position is defined by comparing the list of the present function calling sequence which has been stored in the internal variable with the contents of the column in the tree table 20c, or by comparing the address of the present execution statement fetched in the process 504 with the contents of the column in the text table 21a. The display is represented as in 82 and 83 in FIG. 8. In the process 521, the report on the execution condition with respect to the user function in which the error occurs as in 84 of FIG. 8 is displayed.

Figure 5:
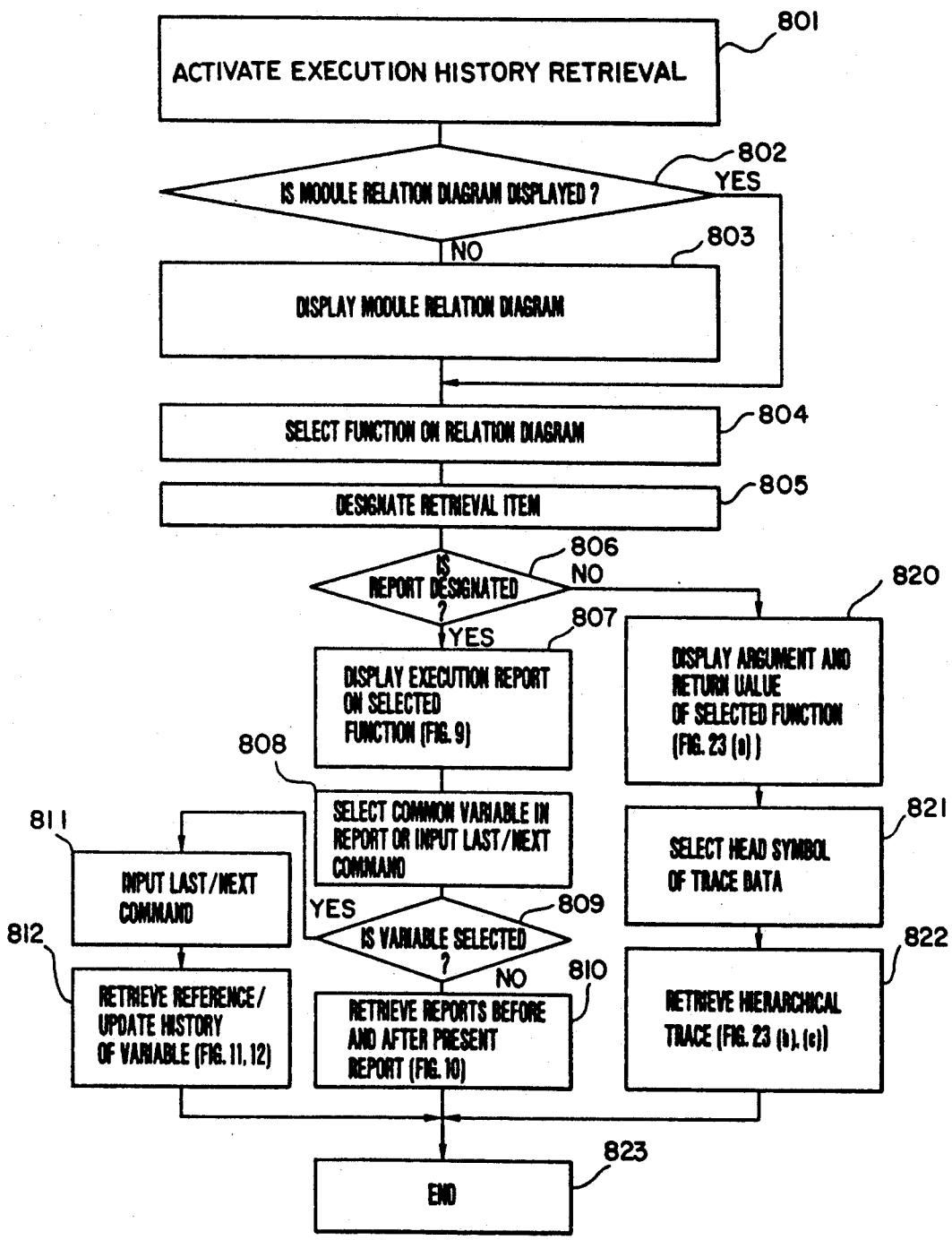
FIG. 5 is a flowchart representing a sequence to executed an execution history retrieval of executed functions according to third, fourth and sixth preferred embodiments of the present invention.

If the content of the error is clarified, the user accomplishes the testing or debugging of the program. Furthermore, when the execution history with respect to other functions is checked for the reason of error occurrence, the process is branched as shown in FIG. 5 (will be discussed later).

The second preferred embodiment relates to a debugging support method employed during the execution of the program, by which the latest execution position and execution state of the program are displayed in accordance with the sequential execution of the program.

A display content of a screen while executing the program is as shown in FIG. 8. It should be noted that the command menu of the region 87 shown in FIG. 8 is continuously displayed. Every time one statement is executed, the execution position, execution condition, and display of the execution report are updated, and such a command input condition that the execution control is performed in the interactive mode is set. The sequential (step) execution designation of the statement of the function is performed by designating "EX-P_STEP" in the command menu of the region 87 through use of the mouse by the user.

In accordance with the sequential execution of the statement, the source statement of the function under the execution is displayed, and the statement to be executed corresponding to the present execution position is sequentially, discriminatively displayed in the region 82 as shown in FIG. 8, similar to the region 86.

In the region 83, the function position under the execution and the executed function are discriminatively displayed on the relation diagram representative of the calling relationship of the function.

Also, in the region 84, both the previously described report and the present value of the similar item are displayed as the execution content of the function under execution. The display content of the region 84 is updated every time the execution step is advanced. When a different function is called, the source text of the called function is displayed and therefore the contents of the discriminative displays of the execution conditions of the relation diagram and the contents of the report screen are updated.

It should be noted that the display method for the respective screens, acquisition of the executed report, and storage method may be realized by means similar to those of the first preferred embodiment.

Under such a condition that a control for an execution of a program is performed in an interactive mode (capable of inputting a command), it has been known that a break point in the program is designated by selecting an arbitrary statement in a source text of the region 82, and also the program is interrupted at each break point (already explained in the description of well known prior methods). In accordance with the preferred embodiment, means for designating a break point at a unit of a function, rather than at a unit of a statement, is newly added to the relation diagram of the region 83. A function to set the break point can be designated by designating a B.P. (Break Point) command for the region 87 with a mouse after a specific function name in the region 83 is selected by the mouse. Furthermore, the sequential execution is carried out in a unit of function on the relation diagram by designating a TREE_STEP command in the region 87 with the mouse. In accordance with the TREE_STEP command, the conventional sequential execution is interrupted in the unit of all statements, whereas the sequential execution of the preferred embodiment can be interrupted in the unit of the reference (calling) of the user defined function.

Figure 3:
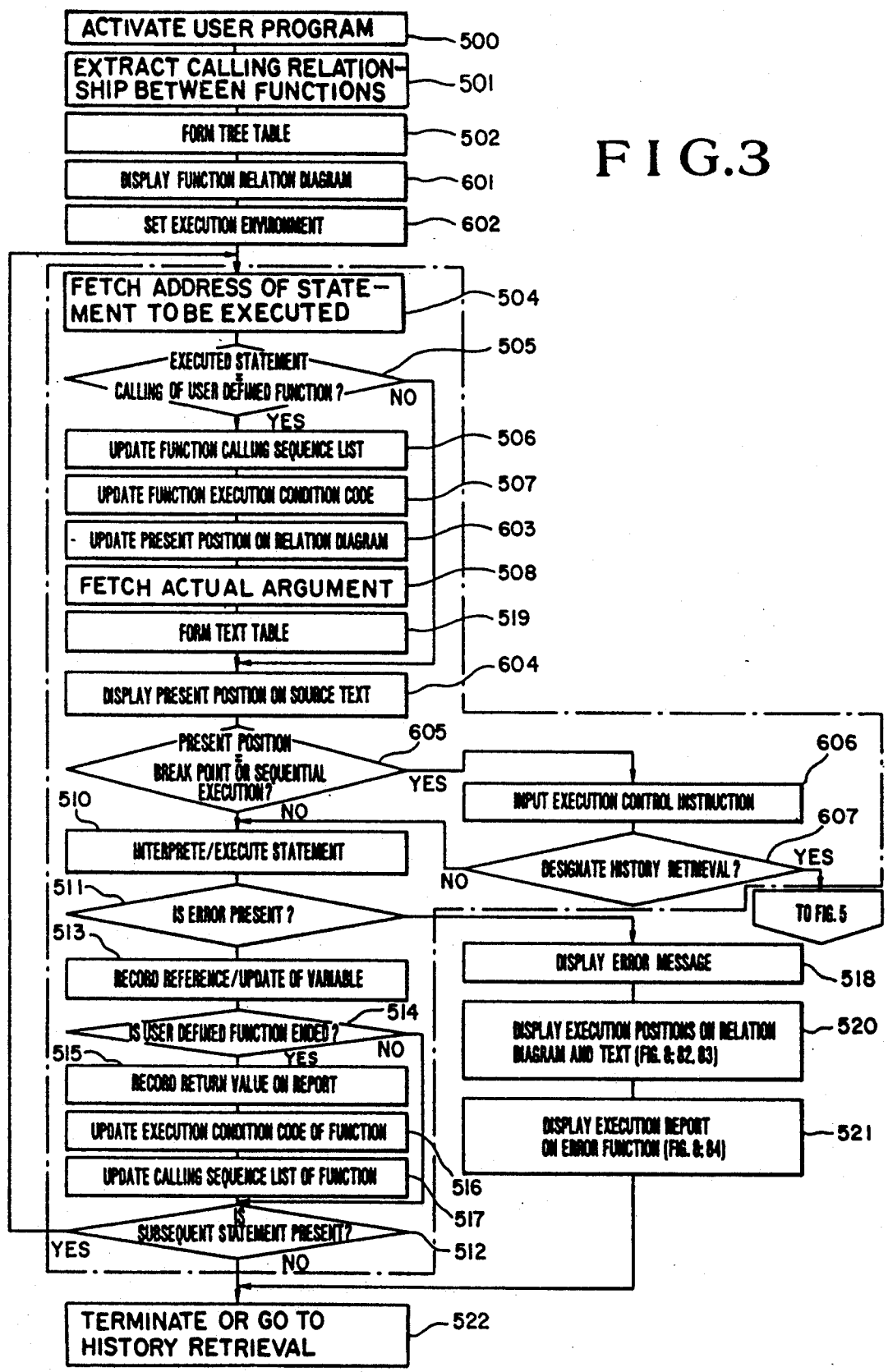
FIG. 3 is another overall process flowchart for realizing a display of a sequential execution condition of a program, according to a second preferred embodiment of the present invention.

The designation information on the break point is stored into the internal variable within the main memory apparatus, and the execution is controlled while referencing this designation information by an execution monitor program (a process 605 shown in FIG. 3).

When a GO command of the region 87 shown in FIG. 8 is designated, the execution is continued up to the break point, the program execution at the point of the designated break point is interrupted, and such a condition that the command can be input in the interactive mode is then reestablished.

In accordance with the preferred embodiment, the user can monitor the process only up to the function at the specific hierarchical level to check the execution path and execution condition.

In FIG. 3, there is shown a flowchart of an internal process to realize the second preferred embodiment.

Since the processes to which the numbers on the order of 500 have been attached are the same as those of the first preferred embodiment, no explanation is made thereof in the following descriptions.

In process 601, a module relation diagram is displayed as represented in 73 of FIG. 7 or 83 of FIG. 8 in accordance with the above-described tree table.

Process 602 sets an execution environment, in which a position of an execution break point on a module relation diagram, and also a range of a function for acquiring a report on an execution history is designated.

Process 603 corresponds to such a process that the discriminative display of the present position on the module relation diagram is updated every time the user function is newly executed. When the list of the function calling sequence actually called is coincident with the list of the calling sequence stored in the tree table, the branch identification number at the present position is defined.

The setting of the text table in the process 519 is performed when the respective functions are newly executed.

In process 604, the display at the present position on the source text is updated. If the address of the present statement fetched at the previous process 504 is coincident with the content of the region 21a in the text table, the present position can be specified.

Process 605 corresponds to a process for judging whether or not the present position is equal to the previously set break point, or whether or not the execution method is the sequential (step-by-step) execution.

If the judgement result corresponds to the YES or true judgement condition of the process 605, a command of the execution control is received in process 606.

When the retrieval commend of the execution history is designated at the process 606, the control process 607 is advanced to processes shown in FIG. 5 (described below). Otherwise, the control process is advanced to a process 510.

In accordance with the third preferred embodiment of the present invention, the execution report (execution history) of the above-described executed function is held in connection with the respective branches of the module relation diagram, the execution history of the function designated in the module relation diagram is extracted for display purposes after the program execution is accomplished.

Figure 9:
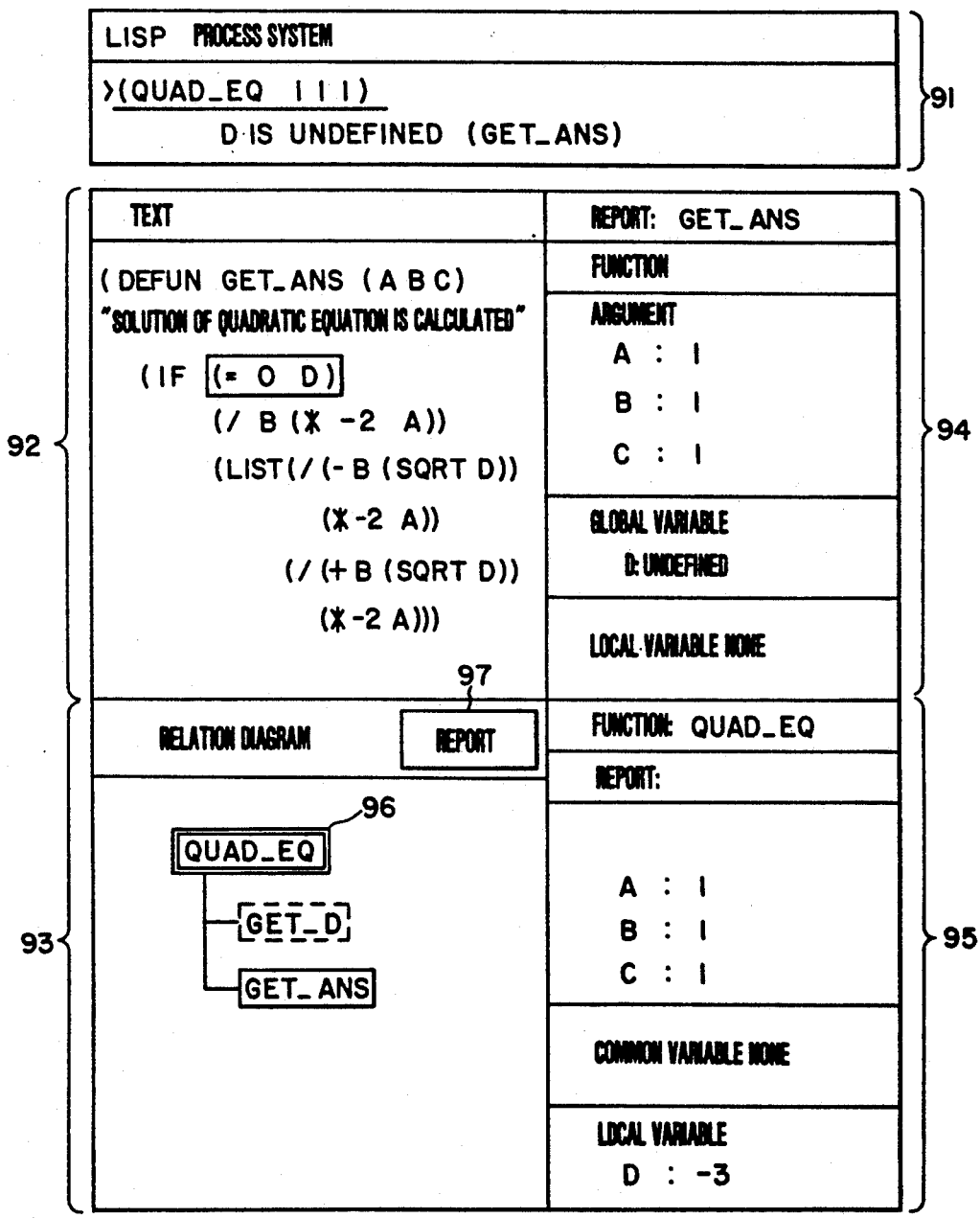
FIG. 9 represents a display example according to the third preferred embodiment and corresponding to the display example shown in FIG. 8 to which an execution report on a branch module designated in a module relation diagram has been added.

The addresses of the reports produced at the respective branches are held in column 20g of FIG. 13. In accordance with this address, the same tree structure as the module relation diagram is formed between the reports. FIG. 9 is an example of a screen represented in the region 95 where the execution report of the function 96 designated on the module relation diagram in the region 93 is displayed.

Contents of the regions 91 to 94 are the same as those of the regions 81 to 84 shown in FIG. 8. After the user has selected the function QUAD_EQ (96) on the relation diagram of the region 93, and designated the report 97 in the command menu by use of the mouse, the execution report of the designated function is displayed in the region 95. As a result of the representation of this region 95, the cause of the error in the above-described program can be solved as follows below. That is, since the variable "D" corresponding to the undefined variable has been set as the local variable in the function QUAD_EQ, the value of this variable "D" is not transferred to the function GET_ANS for calculating the solution.

It should be noted that the execution report of the function designated on the module relation diagram is not limited to one, but may be executed a plurality of times in loops and the like. At this time, a plurality of reports are extracted in the execution order. In the region 95 of FIG. 9, there is shown a portion therefor, whereby the respective extracted reports may be referenced by a scrolling operation.

Figure 16A:
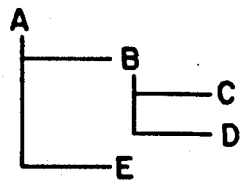
FIG. 16A represents an example of the module relation diagram.
Figure 16B:
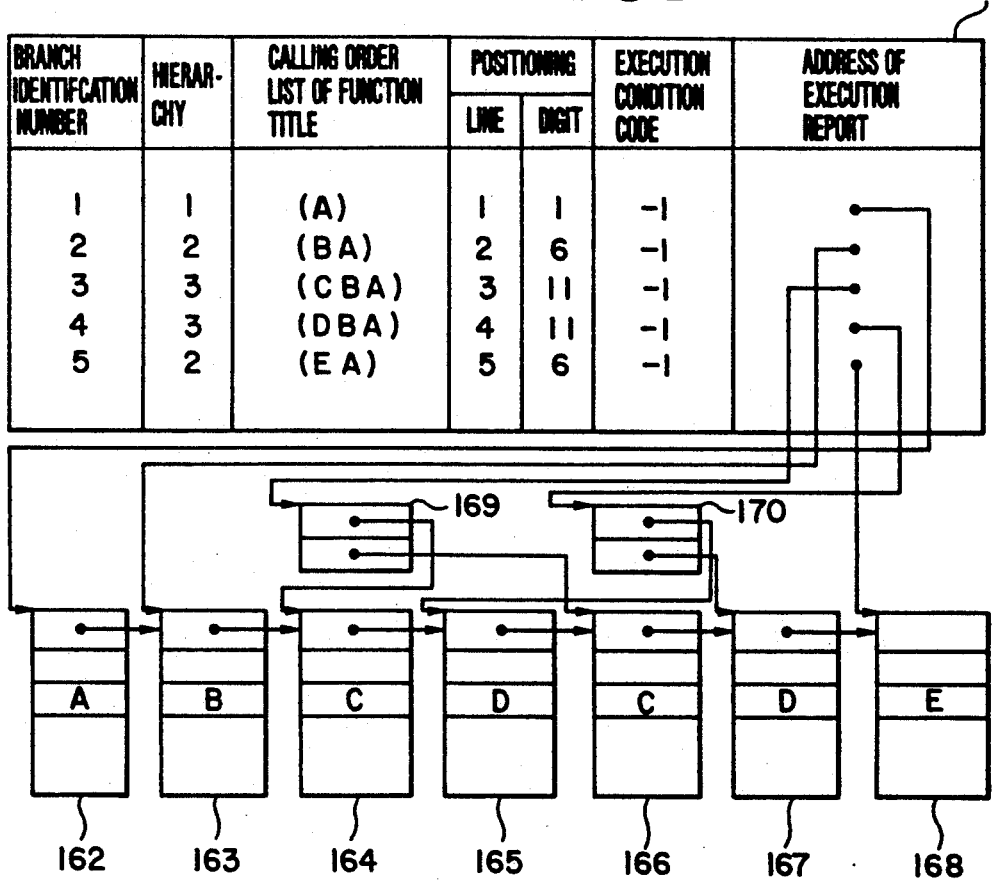
FIG. 16B is an illustration for explaining correspondence and coupling between tree data representative of this module relation diagram and an execution report.

FIG. 16 represents both tree data indicative of a module relation diagram and a relationship of the execution report in a case when the functions corresponding to the branches in the module relation diagram are executed a plurality of times. FIG. 16A represents an example of the module relation diagram in which a function "A" calls functions B and E, and the function B further calls functions C and D. It should be noted that the functions C and D are twice referred from the function B in the order of C, D, C and D. FIG. 16B represents a diagram for representing a relationship between the previously-described tree table and the executed report. In this case, although the functions C and D have been twice referred, one-line data has been recorded in the tree table due to the same relationship on the relation diagram.

Reference numerals 162 to 168 represent that the execution reports produced every time the respective functions are called are arranged in the calling order. The presence address of the respective reports are stored in the region 161 of the tree table when the respective reports are produced. In case of only one execution in the respective branches on the relation diagram, the address of the single report corresponds directly thereto. However, in such a case that the functions C and D are executed a plurality of times, a list is formed in which the addresses of the newly produced reports are successively arranged behind the addresses of the previously formed reports, and the head address of this list is stored into the region 161 as the address of the execution report.

In FIG. 16B, reference numerals 169 and 170 are lists for holding the addresses of plural reports. In case of the LISP language, such a list formation and updating operation of an address value (pointer) are simply described by employing a basic built-in function for a given LISP system.

It should be noted that the display positions of the respective regions 92 to 95 shown in FIG. 9 and the dimensions of the display regions are not limited to the above-described examples, but may be set to necessary dimensions and positions, or each of the regions may be displayed in an overlapping condition. In case that the display regions are narrow with respect to data to be displayed, such as the module relation diagram and report data, a portion of the display contents are cut out so as to be displayed in part. The portion which is not displayed may be observed by using a scrolling operation. These may be provided as the function of the display routine of the workstation employed.

This preferred embodiment corresponds to such a case that the error occurs during the execution of the function. In this case, the program has been executed until the last thereof. However, the return value of the function may not be equal to the expected value. In such a case, the module relation diagram of the executed function is represented as the region 93 of FIG. 9, and the execution report of the function designated on the module relation diagram can be obtained. In this case, both the regions 92 and 94 are not displayed.

In the fourth preferred embodiment, a description will now be made to such a case that reports on an execution history which have been stored in each branch of a module relation diagram may be referenced so as to be displayed in an execution order or an order opposite to the execution order (reverse execution order).

This may be realized in such a manner that when the execution history report for each function is produced, the relationship with the respective branches in the module relation diagram is recorded and a calling order pointer is sequentially set in the production order of this report, and also an ending order pointer is set in an ending order of execution for the respective modules, whereby the respective execution history reports may be linked with each other.

Figure 17A:
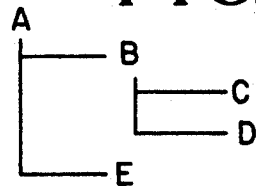
FIG. 17A represents an example of the module relation diagram similar to that of FIG. 16A, FIGS. 17B and 17C are illustrations for explaining such a condition that a pointer indicative of a coupling between the report data has been made.

FIG. 17 is a schematic diagram for explaining a method of setting the above-described pointers. FIG. 17A is a schematic diagram for representing one example of a module diagram, which is identical to the previous example shown in FIG. 16.

Figure 17B:
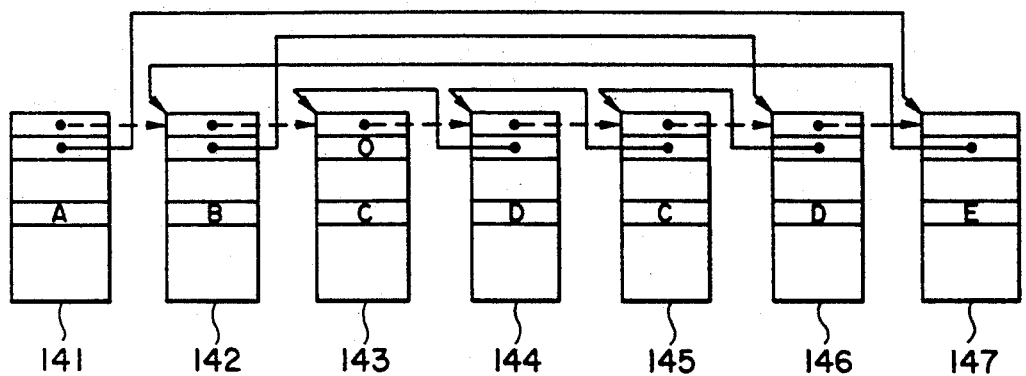

Reference numerals 141 to 147 shown in FIG. 17B correspond to the execution reports of the respective functions which have been arranged from the left-most position of the production order. At the heads of each of the respective reports, the address of the subsequent report (calling order pointer) is stored and the calling order is represented by a dot line with an arrow as shown in FIG. 16.

In the second columns of the respective reports, the address of the report (ending order pointer) which has been ended before one complete execution so as to be traced in an order opposite to the formation order of the execution history report (in this figure, the reference relationships of the execution history report is denoted by a solid line with an arrow). In accordance with the present invention, since the ending order pointer is defined, it can reach a module causing an error while tracing this ending order pointer and confirming the result of the executed module.

In accordance with this preferred embodiment, since the execution of the function C is called from the function B is first accomplished, "0" is stored into the second column of the report 143 of the function C. Subsequently, the execution of the function D is ended. At this point, the head address of the report 143 of the function C which has completed its execution prior to the execution of the function D, is stored into the place of the ending order pointer corresponding to the second column of the report 144 of the function D. Similarly, at the ending time instant of the execution of the function C which has been again called by the function B, the head address of the report 144 of the function D which has been ended prior to the execution of the function C is stored into the place for the ending order pointer of the report 145 of the function C. The address of the report on the function the execution of which has been accomplished just before is continuously, temporarily stored into the internal variable, and also the value stored into the internal variable is set into the ending order pointer of the function the execution of which has been newly ended. Thus, the ending order pointer is set when the execution of the respective functions are ended in an order of the reports 143, 144, 145, 146, 142, 147, and 141. The storage positions of these calling order and ending order correspond to a first place and a second place of the region 22A of the execution report shown in FIG. 15.

Figure 17C:
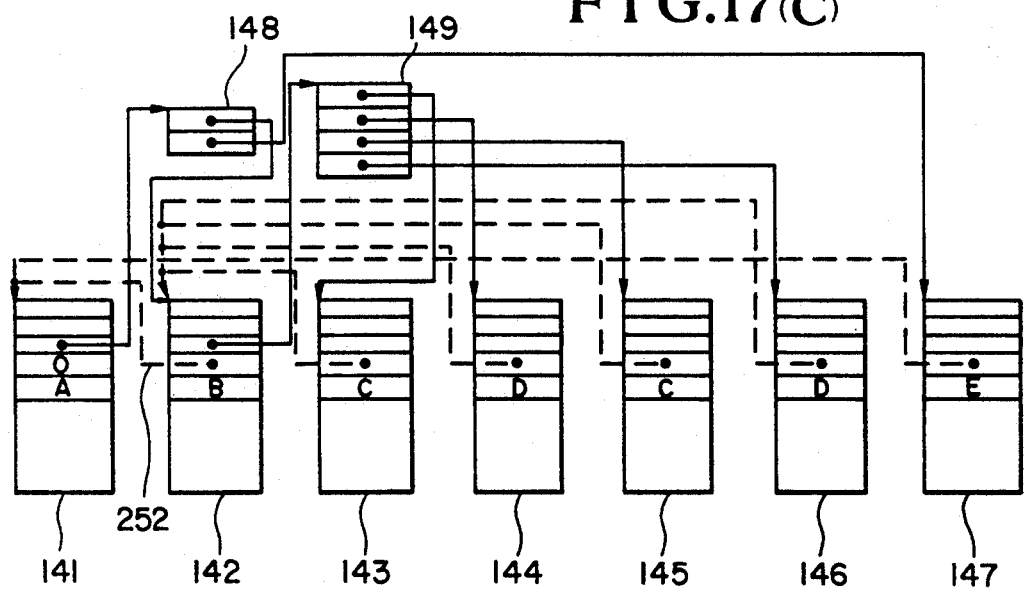

Furthermore, in these execution reports, both an address of an execution report of a called function (called pointer) indicated by a solid line with an arrow of FIG. 17C, and an address of an execution report on a calling function (caller pointer) indicated by a dot line with an arrow are held. The storage positions for the addresses of these calling and caller function reports correspond to a third place and a fourth place of the region 22A of the execution report shown in FIG. 15.

It should be understood that the called pointer corresponds to a pointer for a report on a lower-level function which is directly called by a function in question, whereas the calling pointer corresponds to a pointer for a report on a higher-level function which calls the function in question.

When a plurality of called reports are formed, addresses for the plural reports are held in a list form (otherwise table form) such as 148 and 149, and the addresses of this list are held as the pointer of the called report.

The relationship of the report corresponding to the function calling may be extracted from the tree table, but the retrieval between these reports may be processed at high speed when the linking of the relationship between the reports is held.

Figure 10A:
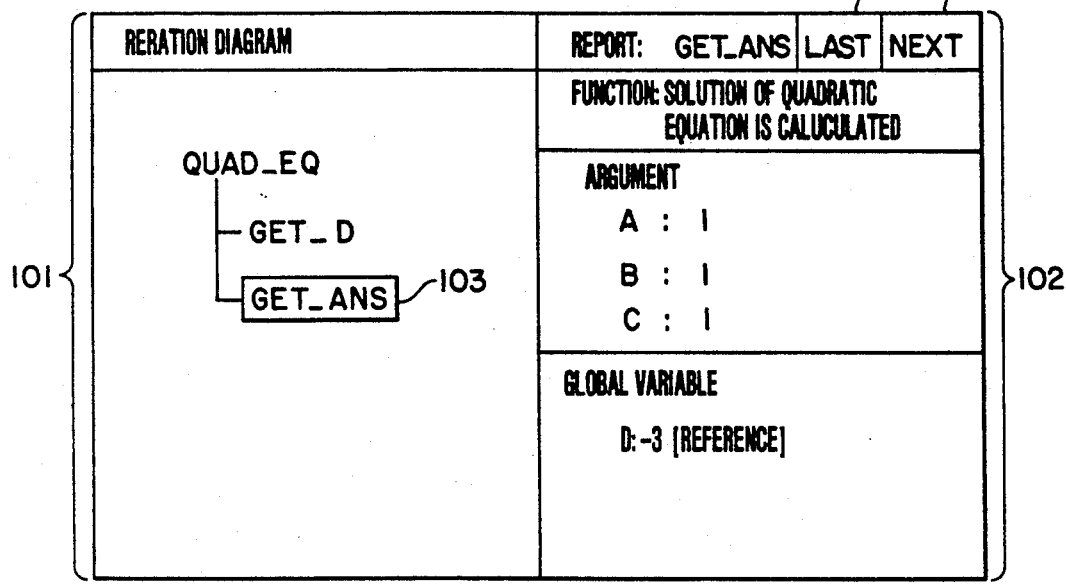
FIGS. 10A and 10B represent screen examples in which an execution history report is referred before and after, according to a fourth preferred embodiment, and a report immediately before the report shown in FIG. 10A is represented in FIG. 10B.
Figure 10B:
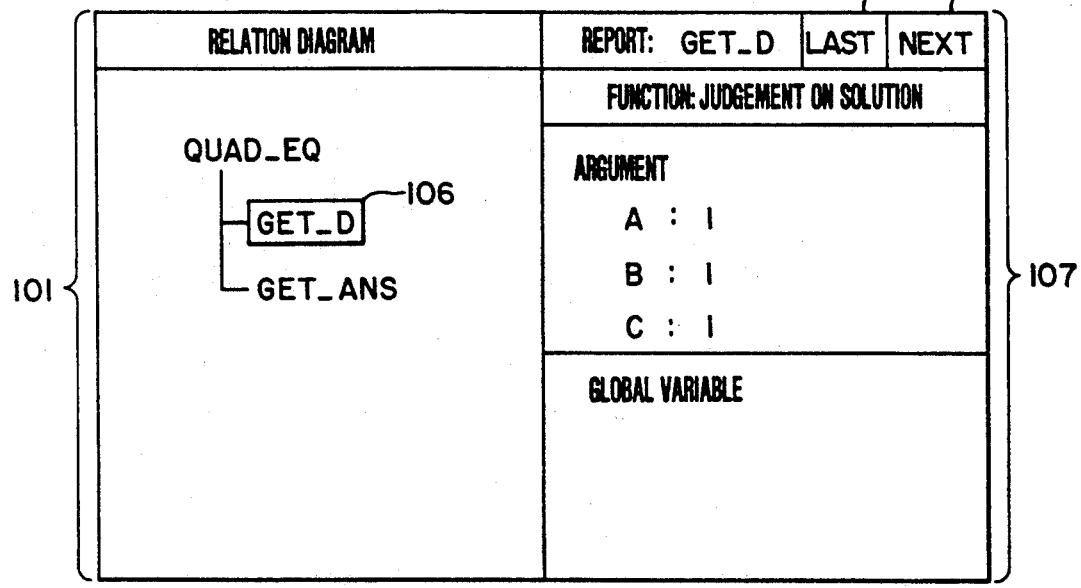

FIG. 10 is an example of a display screen of retrieval operations according to the fourth preferred embodiment, in which the retrieval operations are carried out before and after the execution reports. After the execution of the program has been accomplished, the relation diagram of the executed function is displayed (a region 101). Next, the execution report on the function 103 on the module relation diagram which is designated by a user within the region 101 is displayed in a region 102. Subsequently, when the user selects either a LAST (before) 104, or a NEXT (after) 105 in the upper menu in the region 102, the execution history report on the function which has been executed at the before and after functions that are previously designated via the ending order or calling order pointer denoted in the region 22A of FIG. 15, is retrieved so as to be displayed. FIG. 10B is a screen where the user selects the LAST 104 from the menu shown in FIG. 10A. That is to say, in FIG. 10B, there is shown a report on GET_D which has been executed before GET_ANS. The report on the retrieved module GET_D is displayed in the region 107, and simultaneously the position of the function corresponding to this report is discriminately displayed as in 106 of the region 101.

It should be noted that the retrieval operation of the execution history reports may be similarly performed even after the error has occurred as in FIG. 8.

Then, as an extension of the fourth preferred embodiment, updated or reference positions of the global variable contained in the execution history report are represented on the module relation diagram and source text.

An example of this expanded fourth preferred embodiment will now be described.

The reference/updating history on the global variable employed between the plural modules (functions) can be realized by sequentially retrieving the previously acquired execution history report. In this example, the global variables appearing in the program execution are collected, and the branch identification numbers on the module relation diagram of the functions which have been referred and updated, the variables and the identification codes for the reference/updating variables are recorded. It should be noted in this preferred embodiment that since not only the functions for performing the reference/updating operation must be identified, but also the positions on the source text must be identified, the address on the source program is acquired and held at a time instant where the global variable is referenced and updated. The historical information on the reference/updating operation is accumulated so as to be stored in the execution order.

FIG. 18 is a table for holding historical information of the reference/updating operations for the global variable D in such a program to calculate the solution of the above-described quadratic equation. A first line of this table represents that at the branch identification numeral 1, reference update flag (a value of a flag is equal to 1), variable value −3, and updated text position are constituted by 1 line, 5 digits. Similarly, a second line of this list indicates that at the branch identification number 3, reference update flag (a value of a flag is equal to −1), a variable value thereof being −3, and referred text position are constituted by 1 line, 8 digits.

It should be noted that the branch identification numbers in this example correspond to those of the previously described tree table.

Based upon the historical information on referring/updating the global variable shown in FIG. 18, the place where the global variable has been referred/updated just before and just after the designated place can be instantaneously detected. In other words, the place where the global variable has been referred and updated can be discriminated as to the text position thereof from FIG. 18, and also as to the position of the relation diagram from the display position of the function name for the line of the branch identification number corresponding to the tree table.

FIG. 11 represents an example of a display screen according to the expanded fourth preferred embodiment. After the program for calculating the solution of the above-described quadratic equation has been executed, a global variable D in an execution history report (region 113) of the function GET_ANS is selected by employing a mouse by a user, and also when LAST 115 is designated from the command menu by the mouse, a position of a function by which the global variable D has been finally (just before) updated with respect to this report is represented in 117 of the region 112, and further a source text position is displayed in 116 of the region 111. The retrieval method, shown in FIG. 18, for the reference/update historical information on the global variable D designated by the mouse is as follows.

First, since the branch identification number of the function is equal to 3 at a time instant where the report on the function GET_ANS designated on the module relation diagram, the second line shown in FIG. 18 corresponds to the present display position. Subsequently, a detection is made that the just before updating position corresponds to the first line of FIG. 18 positioned prior to this updating position, so that the respective discriminative display position can be specified. If there are plural lines having the same identification number in the table shown in FIG. 18, the data positioned at the last updating position is understood as the present position.

Similarly, FIG. 12 is an example of a display screen according to the expanded fourth preferred embodiment. That is, a display position 124 of a global variable D among an execution history report (region 123) of a function QUAD_EQ is selected by employing a mouse by a user, and furthermore, when another display position 125 of NEXT of a command menu is designated, a position of a function by which a global variable D has been referenced or updated subsequently, and a source text position are discriminatively displayed as 127 in the region 122 and 126 in the region 121. The discriminatively displaying places may be specified from FIG. 18, similar to the previous preferred embodiment.

In the above-described fourth preferred embodiment, the display of the referring/updating place of the global variable has been retrieved and updated. Such a modification may be realized that the display of the execution report (regions 113 and 123) is updated.

In accordance with the fourth preferred embodiment, after the program is executed, the updating conditions of the global variable utilized among a plurality of functions can be readily grasped.

It should be noted in the fourth preferred embodiment that the updating results of all of the global variables are held as the contents of the execution historical reports of the functions. Alternatively, taking account of the aim of the debugging operation and memory capacity, a user may preset the acquisition range of the execution history, the designation on the variable to acquire the updated history, and so on, as a setting operation of the execution environment before the program is executed, so that the acquisition of the execution history may be performed based on the contents of the setting operation. If there is sufficient memory capacity, execution count, execution time and memory size in use can be included in the contents of the report of each function. The parameters defining these execution environments are stored into the internal variable within the program to carry out the debugging operation, and referred during the execution of the program and also the acquisition operation of the execution history.

It should be noted that the above-described preferred embodiments correspond to examples of the support methods for analyzing and debugging the operations at the level of statements of the source program.

In general, in a program of a function type language such as a LISP language, the user often needs to grasp an entire movement of the program. In such a case the user pays attention only to the values of arguments and return value of the function.

In accordance with a fifth preferred embodiment, as the display method of the execution conditions of the program, the above-described function calling diagram is displayed in a first display region, whereas both the arguments and return values of a series of the executed modules are displayed in a second display region in connection with the sequential execution of the program.

In FIG. 19, there is shown an example of a source program written by the LISP language, in which three function definitions (foo, bar and fact) are presented. The function "foo" is written that after a function to calculate a factorial "n", i.e., n!, has been executed, the function "bar" is executed as a result between n and n! being the argument. As a result, the function "foo" is defined as a function to calculate n!/n as a whole.

FIG. 20 represents a display example of an execution screen for a program of the LISP language. A display region 201 corresponds to an interactive region for inputting and performing the statement of LISP. The display region 201 represents that a result of an execution in which an integer 3 is given as an argument to the function "foo" as indicated in 41A, a return value becomes 2. A display region 202 shown in FIG. 20 corresponds to a module relation diagram for indicating a calling relationship of a function which has just been executed. The input statement (INPUT_FORM) represents that the function "foo" is executed, both the functions "fact" and "bar" are directly called from "foo", and fact is further called from fact. The function name "fact" to which a parenthesis has been added represents that there exists a call of a function having the same name in the upper grade level thereof. It should be noted that the function "foo" directly corresponds to the recursive call. The contents of the module relation diagram shown in the display region 202 are described in a tree table shown in FIG. 24.

The display region 203 shown in FIG. 20 is a display example where both values of arguments and a return value of an executed function are sequentially outputted in accordance with the execution of the program. The data on the respective lines are lowered by varying the quantity of the representing dots in response to a depth of calling. A mark ▼ at a head position implies trade data at a commencement of a function, and another mark ▲ implies trace data at the end of the function. When the display outputs of the trade data exceed over the lowermost line of the display region 203, these display outputs may be successively scrolled in one-line unit in the upward direction of the display screen.

FIG. 25 represents a storage format of trace data represented in the display region 203. Information to be recorded includes the number 24a of an execution sequence; a serial number 24b of a function which has been attached to a newly called function; a calling path 24c; a calling depth 24d; an argument or return value 24e; and, a display line number 24f. In this preferred embodiment, the trace data of all the executed functions have been acquired. However, there is a limitation on an acquirement of a trace data within a range of a designating branch on the module relation diagram before the execution. It should be noted that the execution position (present position) of the program is discriminatively displayed as 204 on the module relation diagram 202 in FIG. 20.

Figure 21A:
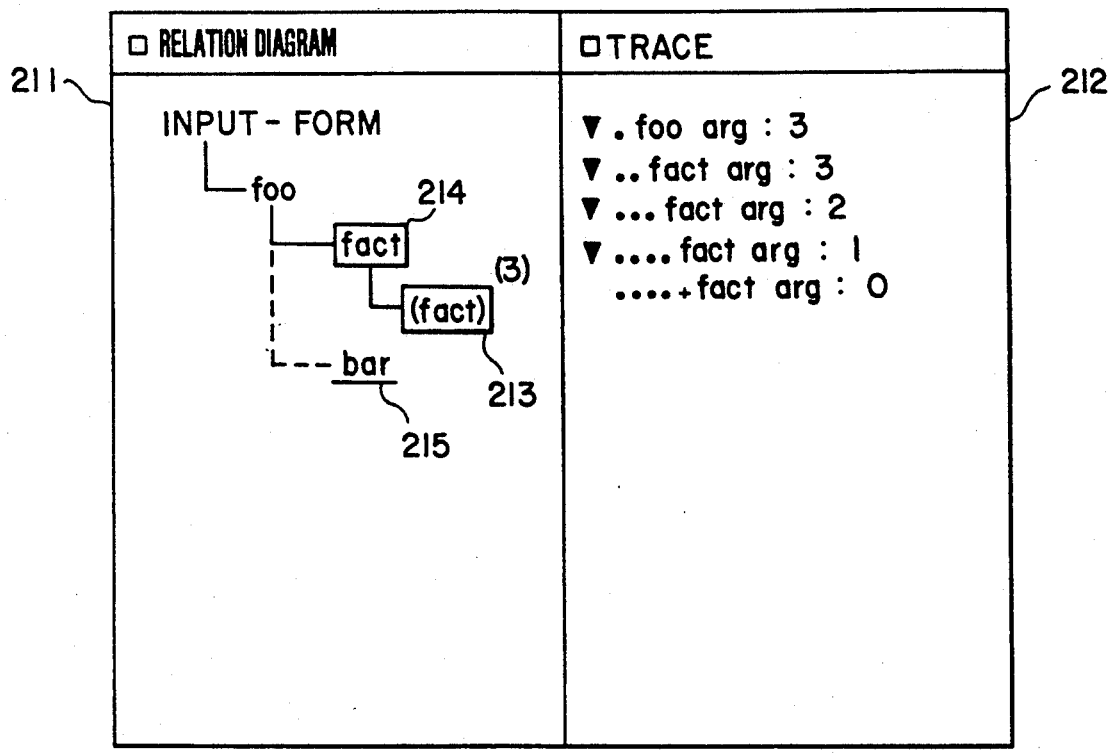
FIG. 21A represents both a module relation diagram during a recursive call of a function, and a trade data.

FIG. 21 represents another example of the trace display method under the execution of the program. FIG. 21A represents a trace display example immediately after the third recursive calling operation has been executed, in which the function "fact" called from the function "foo" is recursively executed. In a relation diagram at the left side of FIG. 21A, to represent a recursive calling relationship, there is shown a numeral which indicates both identification of the function at the recursive side and the recursive depth at the right shoulder portion thereof as portion 213, and a position under the execution is discriminatively displayed as a portion 214. A branch 215 of the function "bar" corresponds to a port which has not yet been executed.

Figure 21B:
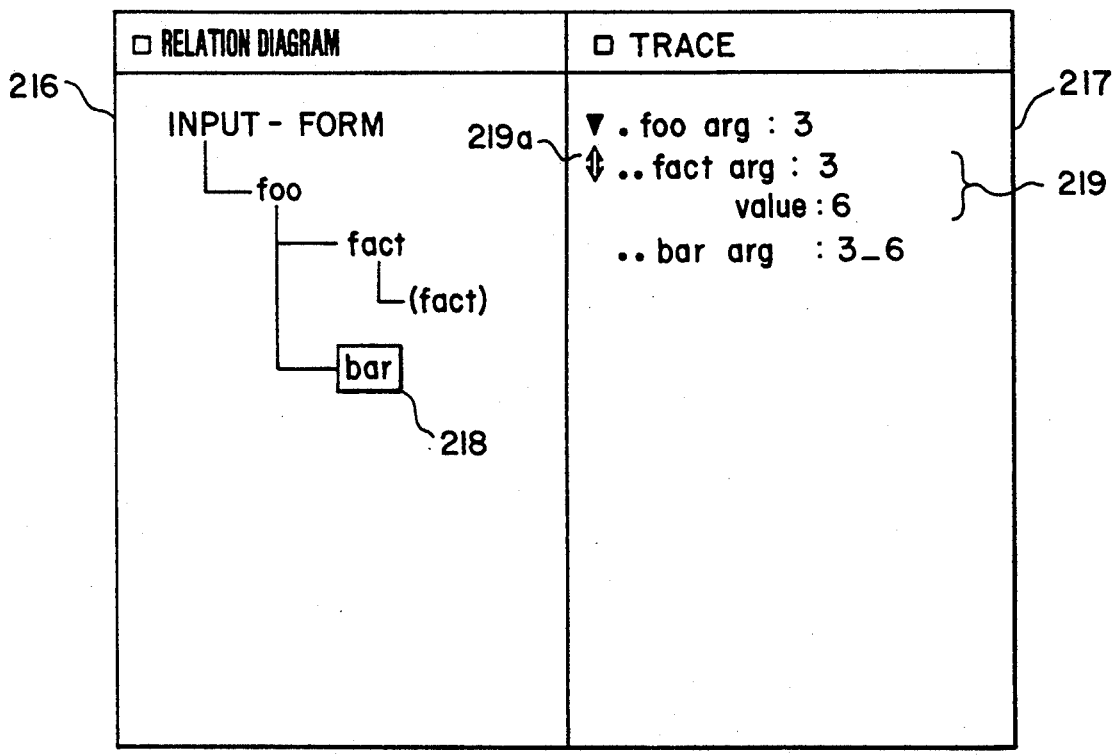
FIG. 21B represents a screen on which the trace data after the recursive call has been accomplished is reduced, for display purposes.

Then, FIG. 21B is a trace display example just after the commencement of the next function "bar" after the process of the function "fact" (factorial "n") has been ended. At this time, the discriminative display of the present execution position has been moved to a position of the function "bar" as represented in 218 in the display area 216 of the module relation diagram. In this case, the display of the region 217 for the trace data is as follows. That is, the resultant outputs of the trace data of the function "fact" are returned by two lines, as represented in the portion 219. In other words, the display of trace data of a series of recursive states is realized by the argument and return value of the upper grade therein. Such a representation may be realized in such a manner that the display portion of the argument and return value of the lower-graded function which has been directly called form the function, the execution of which has been accomplished just before, is deleted from the previous trace display, and then this operation is repeated. Referring to the serial number of the function of the trace data and the hierarchical level thereof shown in FIG. 25, the data range to be deleted on the display may be clarified. At this time, the contents 24f of the displayed line shown in FIG. 25 are updated.

Also, a symbol 219a at the head position of the display line 219 shown in FIG. 21B denotes that the calling trace data position at the lower grade thereto has been omitted. As previously described, since the trace displays which normally continue from several tens to several hundred of lines are made compact for display purposes, both the function under the execution and execution condition at the same hierarchical level can be readily grasped.

It should be noted that re-expansion of the omitted display portion will be discussed later.

Furthermore, FIGS. 22A and 22B represent a trace display during an execution of a program as shown in the previous FIGS. 21A and 21B, according to another preferred embodiment. A display region 221 positioned at a left side of a module relation diagram shown in FIG. 22A corresponds to an example in which a recursive call of a function having the same name is directly expanded and displayed. Reference numeral 223 denotes a discriminative display of a present execution position. Another region 222 positioned at a right side of this module relation diagram is the same as the region 212 shown in FIG. 21.

Another region 224 shown in FIG. 22B represents a module relation diagram immediately after the execution of the next function "bar" after the process of the function "fact" has been accomplished. In FIG. 22B, the branch of the module relation diagram corresponding to the function which has been directly called from the previously executed functions, is deleted for the display purpose. That is to say, at the ending time instant of the process for the last called fact, the branches indicative of a series of fact callings are reduced to one branch of a fact as shown as a result 226. Furthermore, a symbol 226a for representing that a lower-graded call has been made is attached to a function name in question for the display purpose. Such a reduction (omission) display enables a display of a redundant calling relation diagram such as a multiple repeating call to be avoided. Reference numerals 227 shown in FIG. 22B is a discriminative display of a present position. A region 225 is identical to the region 217 shown in FIG. 21. On displays shown in FIGS. 21A, 21B, 22A and 22B, it is possible that either of the module relation diagrams 211, 216, 221 and 224 or the trace data 212, 217, 222 and 225 are not displayed on the screen.

Figure 4:
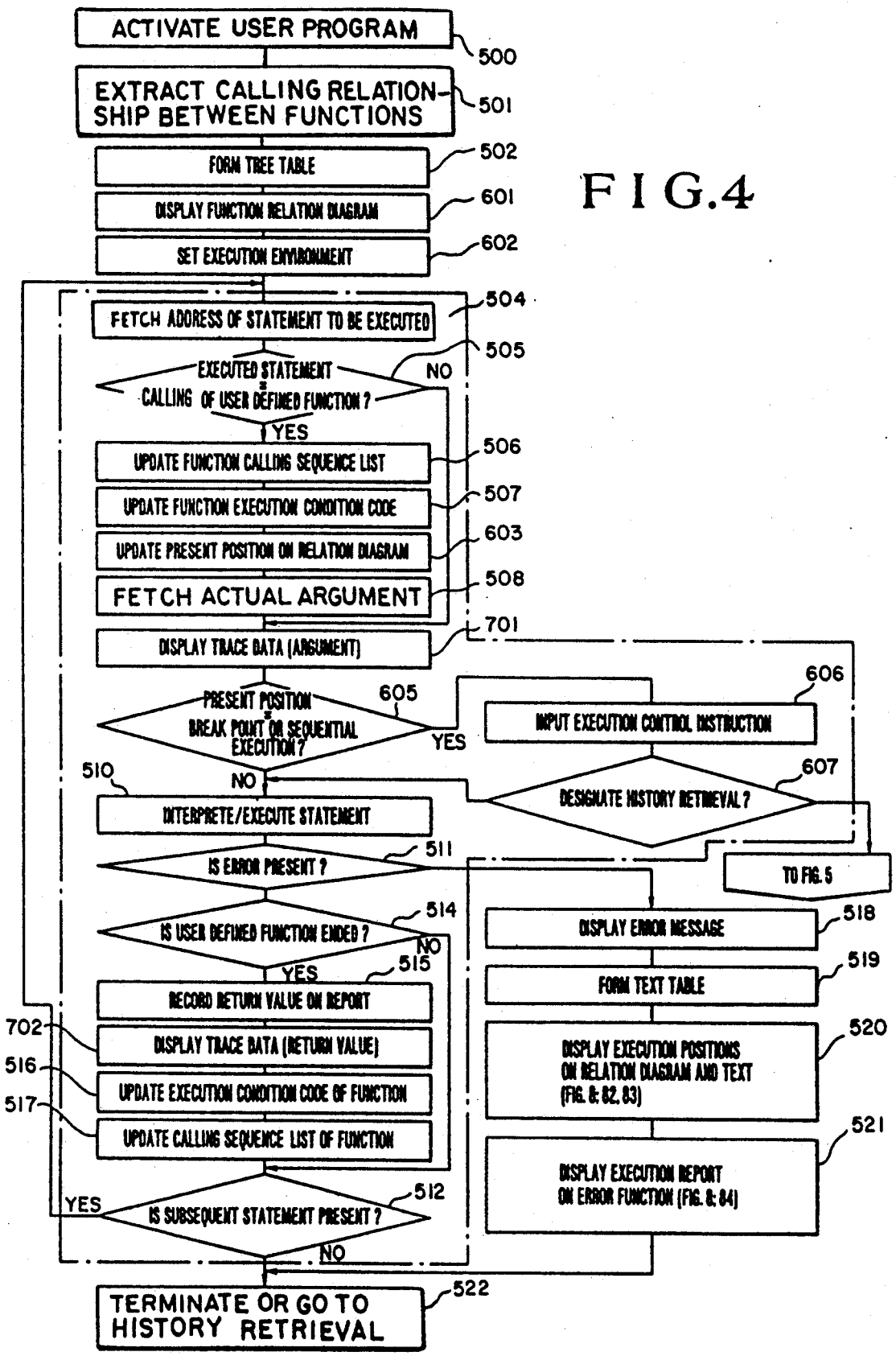
FIG. 4 is a further overall process flowchart for realizing a display of trace data constructed of an argument-/return value of a function during the program execution according to a fifth preferred embodiment of the present invention.

In FIG. 4, there is shown a flowchart for explaining an internal process according to a fifth preferred embodiment. It should be noted that most of these processes are common to those of FIG. 3. An explanation for the common portions (process numbers 500 to 603 is omitted). Both the process 604 (i.e., the present position of the source text is displayed) and the process 513 (i.e., the reference update of the variable are recorded on the report) shown in FIG. 3 are not required in this preferred embodiment. Alternatively, display processes 701 and 702 of an argument and return value are additionally inserted. A setting process 519 for a text table is designed to be executed only when an error occurs.

FIG. 23 indicates a sixth preferred embodiment according to the present invention, in which trace data consisting of the above-described argument and return value is retrieved so as to be displayed after an execution of a program has been accomplished.

Figure 23A:
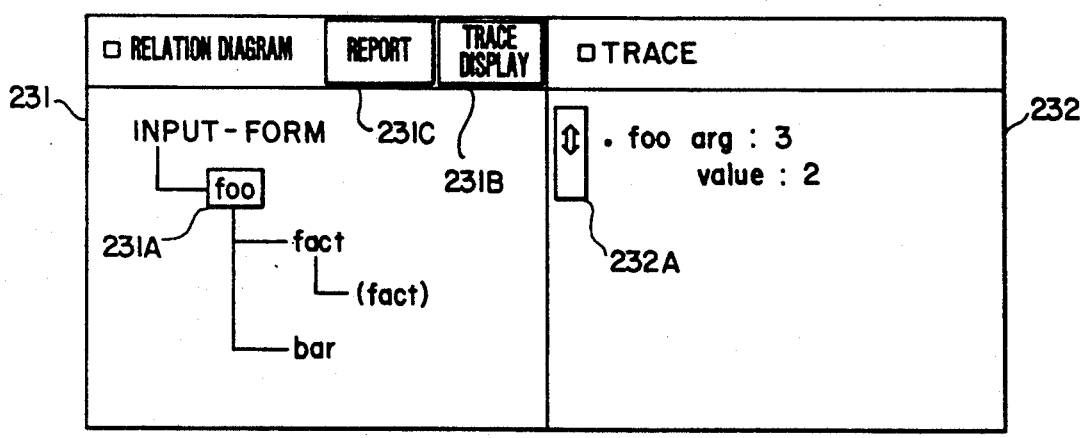

Once a command for retrieving an execution history is inputted by a user, a module relation diagram of a function which has been executed just before is displayed in the region 231 of FIG. 23A. Subsequently, the user selects a function name by which an execution history is wanted to be investigated on the module relation diagram. In addition, the user designates by a mouse a command menu 231B written as "trace display" and newly, additionally set on the upper stage of the module relation diagram. In the display region 232 of FIG. 23A, there is represented a display example in which trace data on the designated function foo 231 is displayed. At this time, when the calling operations of the designated function are performed in plural times, a plurality of trace data are expanded and all of the expanded trace data are simultaneously displayed.

To display correspondence to both contents, reference numerals 231A and 232A in FIG. 23A are discriminatively displayed in the same color.

It should be understood that a symbol 232A is attached to a head of the trace data of the function "foo" represented in the display region 232, which indicates that the trace data of the lower-graded call has been omitted (pack). It is apparent from the serial number of the function of the trace data shown in FIG. 25 whether or not there exist trace data of a lower-graded call.

Figure 23B:
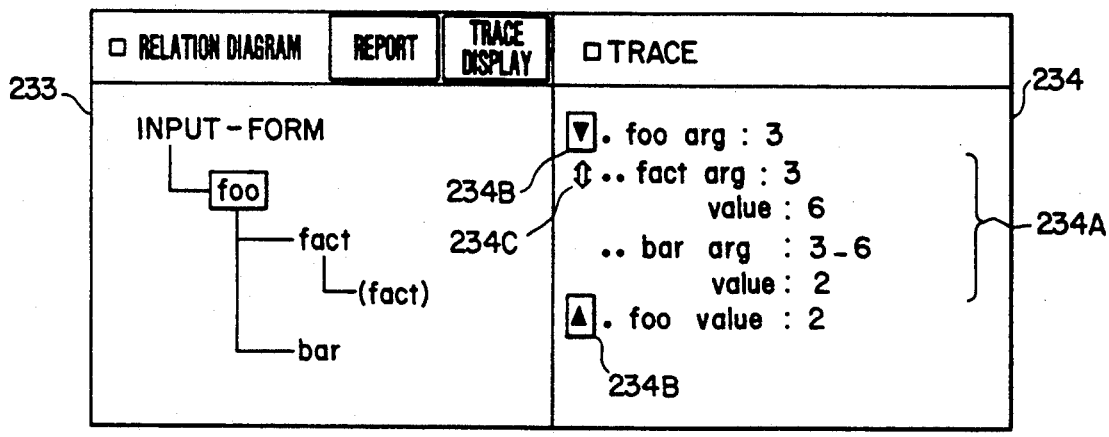

Subsequently, a trace display such as the display region 234 of FIG. 23B is performed by designating a symbol 232A by way of a mouse. In other words, only the trace data defined by one hierarchical data among the trace data and obtained by the calling from the designated function "foo" is expanded and then displayed.

This trace data is acquired by extracting all of the data belonging to the hierarchical level 2 in FIG. 25. A combination between the function "fact" and the argument/return value of the function "bar" is extracted from a portion where 234A in FIG. 23B has been expanded. It should be noted that a symbol 234C representing that there exists trace data of a further lower-graded call, is attached to the head of the function "fact".

At to the trace data on the function "foo", since the lower-graded trace data has been expanded and displayed, a symbol attached to a head thereof is changed into marks ▼ and ▲ as represented in 234B. IT should be also noted that a display of a display region 233 is identical to that of the display region 231.

Figure 23C:
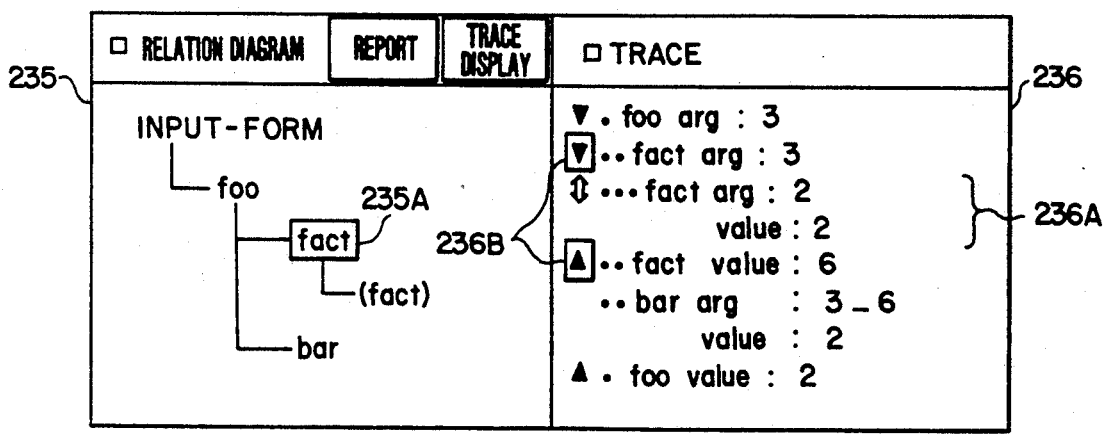

In addition, when a symbol 234C, positioned at the head portion of 234A, is designated by the mouse, the trace data of the designated function "fact" corresponding to one lower-graded line is expanded and displayed in 236A of the display region 236 shown in FIG. 23C.

Now, a display for indicating that an attention point (present position) has been moved to a portion of the function "fact" designated by the mouse, is performed as represented in 236B. To a position on the module relation diagram corresponding to the attention point 236B, such a display indicative of a corresponding relationship as shown in 235A of the display region 235 is made.

Also, when the display position of the symbol ▲ or ▲ of the trace data which has been expanded and displayed is designated by the mouse, it may be returned to the original omission display (display of pack condition). For instance, when the head portion or of the trace data of the function "foo" shown in FIG. 23C is picked, it is returned to the display of FIG. 23A.

With employment of the above-described method, the trace data on the portion to be investigated an be hierarchically retrieved from a large quantity of trace data of the executed program.

In a process 801, an execution history retrieval is initialized in response to a command input from a user.

A process 802 is to judge whether or not a module relation diagram has been represented on the display screen. If no module relation diagram is represented, another module relation diagram of the function which has been executed just before is displayed in process 803.

In a process 804, a function whose execution history is wished to be checked is selected on the module relation diagram. This function is designated by designating the function of the module relation diagram with a mouse by a user. As represented in the display region 93 of FIG. 9 or 231A of FIG. 23A, a place of position of a function name on the module relation diagram, which has been selected by the user, is discriminatively displayed.

A process 805 corresponds to a process to select a retrieval item of the execution history, in which either 231B or 231C of FIG. 23A is designated by the user.

In a process 806, a check is made to the above-described retrieval item of the execution history, and then the process is branched.

When a designation is made to 231C corresponding to the output command of the execution report in the above-described process 805, an execution report corresponding to the function name selected on the module relation diagram is extracted and displayed in a process 807. A display region 95 shown in FIG. 9 corresponds to this display example. Since the existence addresses of the execution report have been recorded with respect to the respective branches of the module relation diagram in the tree table is, the execution report of the branch to which the designated function name has been displayed can be simply extracted.

In the next process 808, the user performs the following process. That is to say, a selection is made whether a global variable among the execution reports displayed on the screen is selected, or any one command from "LAST" and "NEXT" commands displayed at the upper stage of the execution report is selected.

A process 809 is to judge the selection results obtained from the previous process 808 so as to branch the process.

In a process 810, a retrieving operation is carried out for the execution history report of the function which has been executed just before the execution of the function corresponding to the execution history report being displayed, or which has been executed just after this execution of the function, and furthermore, the retrieved execution history report is extracted for the display purpose. FIG. 10 is a display example of this process 810. Both a pointer tracing a calling sequence as presented in FIG. 15 and another pointer tracing a sequence opposite to an ending sequence of an execution have been recorded on the execution history report. As represented in FIG. 17, the retrieving operation may be carried out along either forward or backward direction.

A process 811 corresponds to a process executed in such a case that a global variable in the execution report has been selected. As represented in FIG. 10A, the user selects "LAST" or "NEXT" from the command menu which is being displayed on the upper stage of the execution report.

A further process 812 is a retrieval process for the reference/update history of the variable. That is, the retrieving operation is carried out with reference to the reference/update history 23 for the global variable shown in FIG. 18, and the retrieval results are displayed as shown in FIG. 11 or FIG. 12.

On the other hand, in a process 820, both the argument and return value of the function selected on the module relation diagram are represented. FIG. 23A represents a display example thereof.

In the subsequent process 821, the symbol which has been displayed at the head position of the trace data on the previously displayed argument and return value, is selected and designated by the user with employment of the mouse. As a result the trace data are hierarchically expanded or reduced in a process 822 with reference to the trace data 24 recorded as the execution history in response to both the designated symbol and trace data to which this designated symbol has been attached. In FIGS. 23B and 23C are shown display examples thereof.

A process 823 is to complete the retrieving operation of the execution history.

It should be noted that the processes indicated by the wide frames are effected by way of the user's operations.

In the above-described preferred embodiments according to the present invention, the LISP language processing system is employed so as to realize the basic ideas of these preferred embodiments. Since the LISP language processing system includes an interpreter system for directly executing a source text, the architecture of the debugging support environment containing the interactive mode executions can be readily established.

In case of the compiler language other than the LISP language, the execution of the program may be controlled in correspondence with the source text by inserting the correspondence with the source text into the object code when the object code is produced by the compiler.

Furthermore, a debugging operation similar to that of the present invention may be realized by adding to the respective statements in the object code, a control code for the acquisition of the execution history of the argument and return value, or for being transferred to the interactive mode of the execution control.

It should be noted that as to the module functioning as one constructive unit of the program, this module corresponds to a "function" in the LISP language and C language, whereas this module corresponds to a subroutine and a function subroutine in the FORTRAN language.

In accordance with the present invention, when the error occurs during the execution of the program, since a clear indication can be made on the module relation diagram in such a manner that in which user function (module), the error happens to occur, and also in which statement the error happens to occur, the place where the error occurs can be immediately specified.

Moreover, in the step-by-step execution control of the program, since the executing position of the source text is discriminated and also the executing position on the function (module) relation diagram is represented, the execution path of the program can be readily grasped. In addition, since the values of the arguments and the latest values of the updated variables during the reference operation are displayed in combination with the execution position of the source text as the representation of the execution condition of the function at the same time, no print statement for displaying the intermediate results during the execution of the source program, as effected in the conventional debugging support method, is no longer required to be inserted, so that the workloads on the debugging operation can be considerably reduced.

Furthermore, the report on the execution history for each branch on the module relation diagram can be referred after the program has been executed by designating an arbitrary branch, or by performing the retrieval operation in accordance with the calling sequence of the function, or the ending sequence of the execution. As a result, even if the program to be debugged is not again executed, the execution history can be grasped and also the place causing the occurrence of the error can be easily specified, which results in an improvement of the efficiency of the debugging operation.

We claim:

1. A program debugging support method using a computer having a display device and a memory, the method comprising the steps of:

executing a program stored in said memory, the program comprising modules; and, when an error occurs in said program, displaying on said display device a source text of said program;

displaying on said display device a diagram showing a relationship between said modules comprising said program, said relationship being made from said source text before executing said program;

showing on said display device a first position of said text distinctively on said source text displayed on said display device;

showing on said display device a second position of said diagram distinctively on said diagram displayed on said display device, said first and second positions corresponding to said error which occurs in said executing program.

2. The program debugging support method according to claim 1 further comprising the step of displaying on said display device a report of said program responsive to said error.

3. The program debugging support method according to claim 2 further comprising the step of displaying said report including an argument corresponding to a module in which said error occurs and which is one of said modules comprising said program.

4. The program debugging support method according to claim 1 further comprising the step of displaying said diagram of said modules in a tree-structure.

5. The program debugging support method according to claim 1 wherein the step of showing on said display device a first position of said text includes the step of comparing an address of the fetched present statement with each address of the statement within the present execution module, and wherein the step of showing on said display device a second position of said diagram includes the step of comparing a present module calling sequence list with said relationship between said modules.

6. The program debugging support method according to claim 1 wherein the diagram displaying step comprises the step of displaying said relationship between modules including a calling relationship between user-defined modules.

7. A program debugging support method for use on a computer having a display device, the method comprising the steps of:

displaying on said display device a source text of a program in execution, said program being executed step by step;

displaying on said display device a diagram showing a relationship between modules comprising said program, said relationship being made from said source text before execution of said program;

showing on said display device a first position of said source text distinctively on said source text displayed on said display device;

showing on said display device a second position of said diagram distinctively on said diagram displayed on said display device, wherein said first and second positions corresponded to the executing step.

8. The program debugging support method according to claim 7, further comprising the step of displaying on said display device a report of said executed program responsive to an execution of a step of said program.

9. The program debugging support method according to claim 8 further comprising displaying said report including an argument corresponding to a module comprising said executed program.

10. The program debugging support method according to claim 7 further comprising the step of displaying said diagram of said modules in a tree-structure.

11. The program debugging support method according to claim 7 wherein the step of showing on said display device a first position of said text includes the step of comparing addresses of program statements fetched with addresses of the statements within the executing program module, and wherein the step of showing on said display device a second position of said diagram includes the step of comparing a calling sequence list of the executing module with said relationship between said modules.

12. The program debugging support method according to claim 7 wherein the diagram displaying step comprises the step of displaying said relationship which is a calling relationship between user-defined modules.

13. A program debugging support method using a computer having a display device, the method comprising the steps of:

displaying on said display device a diagram of a relationship of modules constituting a program, the relationship being made from source text before execution of said program;

executing said program;

showing on said displayed diagram a first module of said modules in a different manner from other modules, said module being in execution; and displaying a report relating an executed module corresponding to said first module showed in said displayed diagram.

14. The program debugging support method according to claim 13, wherein said report displaying step further includes;

displaying an argument of said executed module corresponding to said first module showed in said displayed diagram; and, displaying a return value of said first module after each completion of said module.

15. The program debugging support method according to claim 13, wherein said report displaying step further includes:

displaying at least either one of a variable and an argument corresponding to said executed module of said program.

16. The program debugging support method according to claim 13 further comprising the step of displaying said diagram of said modules in a tree-structure.

17. The program debugging support method according to claim 13 wherein the diagram displaying step comprises the step of displaying said relationship which is a calling relationship between user-defined modules.

18. A program debugging support method for use on a computer having a display device and a memory, the method comprising the steps of:

executing a program stored in said memory, the program comprising modules;

storing in said memory a report which shows a history and result of each of the modules executed by said executing step; and, in case that said program is terminated;

displaying on said display device a diagram of a relationship of said modules comprising said terminated program, the relationship being formed from source text before executing said program; and, displaying on said display device at least portion of said report stored in said memory in a manner that a user can recognize a correspondence between a module of said displayed diagram and said displayed report portion.

19. The program debugging support method according to claim 18 further comprising the step of displaying said diagram and said report portion on a screen of said display device.

20. The program debugging support method according to claim 18, further comprising the step of inputting information specifying a report to be displayed, wherein said displayed report corresponds to said inputted information.

21. The program debugging support method according to claim 18, further comprising the step of:

selecting a first module from said modules, wherein said displayed report relates to the selected first module.

22. The program debugging support method according to claim 18 further comprising the step of displaying said diagram of said modules in a tree-structure.

23. The program debugging support method according to claim 18 wherein the diagram displaying step comprises the step of displaying said relationship which is a calling relationship between user-defined modules.

24. A program debugging support method using a computer having a display device and memory, the method comprising the steps of:

executing a program stored in said memory the program comprising modules;

displaying on said display device a hierarchical diagram showing a relationship of modules comprising said program, the relationship being made from source text before executing said program;

after each completion of each said modules executed, deleting from said display device a lower level module of said diagram displayed on said display device, said lower level module being driven by said module.

25. A program debugging support method using a computer having a display device and a memory, the method comprising the steps of:

executing a program stored in said memory, the program comprising modules;

storing in said memory a report which shows a history and a result of a global variable relating to executing steps of said executing program; and in case that said program is terminated;

displaying on said display device a diagram of a relationship of said modules constituting said terminated program;

showing a position in a different manner from other modules of said diagram displayed on said display device;

wherein said position corresponds to modules in which said global variable is used.

26. The program debugging support method according to claim 25, further comprising the step of:

displaying on said display device the value of said global variable related to execution of said modules.

27. The program debugging support method according to claim 25 further comprising displaying said diagram in a tree-structure of said modules.

28. A program debugging support apparatus, comprising:

means for generating relation information of modules comprising a source program, wherein said relation information is made from source text before execution of the program;

memory device means for storing a source text of said program, and said relationship information of the modules constituting said program;

processor means for executing said program stored in said memory device means and detecting an event of said program in execution; and, display device means, connected to said processor means, for displaying said source text and a diagram of said relationship information of said program in execution, showing a first position of said source text in a different manner from others of said source text displayed on said display device means and showing a second position of said diagram in a different manner from others of said diagram displayed on said display device means, said first and second position corresponding to an event which occurs in said executed program.

29. A program debugging support method performed in a computer having a display device and a memory, the method comprising the steps of:

extracting values of arguments and a return value at each of executed modules during execution of a program and recording said values into the memory, said program being composed of said modules and a relationship between said modules having a hierarchical structure, wherein said relationship is made from source text before execution of the program;

after completion of the program, reading out said values of arguments and a return value from said memory and displaying said values of a module selected by a user on a display device;

in response to designation of one of said display values by the user, extracting the values of arguments and a return value of a module directly called by a module corresponding to said designation, from values recorded in said memory;

displaying said extracted values by inserting them between said values of arguments and a return value which are presently displayed; and, in a case that the values of arguments and a return value of the lower level modules are displayed, deleting said values of arguments and a return value of the lower level modules from display device in response to designation by the user.

* * * * *